(12) United States Patent
Nakamura et al.

(10) Patent No.: US 12,330,880 B2
(45) Date of Patent: Jun. 17, 2025

(54) LINEAR CONVEYANCE DEVICE

(71) Applicant: Mitsubishi Electric Corporation, Tokyo (JP)

(72) Inventors: Takuma Nakamura, Tokyo (JP); Shin Sakai, Tokyo (JP); Hiroshi Wakayama, Tokyo (JP); Masaoki Iwase, Tokyo (JP); Kazuhiko Fukushima, Tokyo (JP)

(73) Assignee: MITSUBISHI ELECTRIC CORPORATION, Tokyo (JP)

( * ) Notice: Subject to any disclaimer, the term of this patent is extended or adjusted under 35 U.S.C. 154(b) by 0 days.

(21) Appl. No.: 18/867,462

(22) PCT Filed: Nov. 7, 2022

(86) PCT No.: PCT/JP2022/041450
§ 371 (c)(1),
(2) Date: Nov. 20, 2024

(87) PCT Pub. No.: WO2024/100739
PCT Pub. Date: May 16, 2024

(65) Prior Publication Data
US 2025/0115437 A1   Apr. 10, 2025

(51) Int. Cl.
*B65G 23/22* (2006.01)
*B65G 54/02* (2006.01)
*H02K 41/03* (2006.01)

(52) U.S. Cl.
CPC .................................. *B65G 23/22* (2013.01)

(58) Field of Classification Search
CPC ........ B65G 23/22; B65G 54/02; H02K 41/03; H02K 41/031
(Continued)

(56) References Cited

U.S. PATENT DOCUMENTS 10,532,891 B2 * 1/2020 Walter .................. B65G 37/00
10,759,613 B2 * 9/2020 Neubauer ............ H02K 41/031
(Continued)

FOREIGN PATENT DOCUMENTS

JP    H11-105707 A    4/1999
WO    2015/042409 A1    3/2015
(Continued)

OTHER PUBLICATIONS

International Search Report and Written Opinion mailed on Jan. 24, 2023, received for PCT Application PCT/JP2022/041450, filed on Nov. 7, 2022, 9 pages including English Translation.
(Continued)

*Primary Examiner* — Douglas A Hess
(74) *Attorney, Agent, or Firm* — XSENSUS LLP

(57) ABSTRACT

A linear conveyance device includes a conveyance carrier and a stator-side platform. The conveyance carrier includes: a conveyance carrier main structure; a first roller and a second roller; a mover-side magnetic element that drives the conveyance carrier main structure with respect to the stator-side platform; and a mover-side counter moment generating element that generates a counter moment against overturning of the conveyance carrier between the mover-side counter moment generating element and the stator-side platform. The stator-side platform includes: a first rail that engages with the first roller; a second rail that engages with the second roller; a stator-side magnetic element paired with the mover-side magnetic element to generate a magnetic attraction force in a horizontal direction; and a stator-side counter moment generating element that generates the counter moment between the stator-side counter moment generating element and the mover-side counter moment generating element paired therewith.

11 Claims, 14 Drawing Sheets

(58) Field of Classification Search
USPC .......................................................... 198/619
See application file for complete search history.

(56) References Cited

U.S. PATENT DOCUMENTS

| | | | | |
|---|---|---|---|---|
| 10,913,362 | B2* | 2/2021 | Holzleitner | B60L 13/003 |
| 10,923,997 | B2* | 2/2021 | Hoeck | B65G 35/08 |
| 10,974,914 | B2* | 4/2021 | Kleinikkink | B65G 54/02 |
| 11,618,632 | B2* | 4/2023 | Hogan | B65G 54/02 |
| | | | | 198/619 |
| 11,772,909 | B2* | 10/2023 | Kleinikkink | B65G 54/02 |
| | | | | 198/793 |
| 11,831,216 | B2* | 11/2023 | Nakagome | B65G 54/02 |
| 11,848,594 | B2* | 12/2023 | Kleinikkink | H02K 41/03 |
| 11,904,700 | B2* | 2/2024 | Elsperger | B60L 13/06 |
| 11,926,492 | B2* | 3/2024 | Nakamura | B61B 13/12 |
| 2015/0027860 | A1 | 1/2015 | Kleinikkink et al. | |
| 2019/0077277 | A1 | 3/2019 | Holzleitner et al. | |
| 2019/0100389 | A1 | 4/2019 | Neubauer | |
| 2019/0161284 | A1 | 5/2019 | Walter et al. | |
| 2019/0375597 | A1 | 12/2019 | Kleinikkink et al. | |
| 2020/0028427 | A1 | 1/2020 | Hoeck et al. | |
| 2022/0416637 | A1 | 12/2022 | Nakagome et al. | |

FOREIGN PATENT DOCUMENTS

| | | |
|---|---|---|
| WO | 2018/161160 A1 | 9/2018 |
| WO | 2021/038728 A1 | 3/2021 |
| WO | 2021/261269 A1 | 12/2021 |

OTHER PUBLICATIONS

Decision to Grant mailed on Jul. 4, 2023, received for JP Application 2023-519123, 5 pages including English Translation.

* cited by examiner

LINEAR CONVEYANCE DEVICE

CROSS-REFERENCE TO RELATED APPLICATION

This application is a national stage application, pursuant to 35 U.S.C. § 371, of International Patent Application No. PCT/JP2022/041450, filed Nov. 7, 2022, the entire contents of which are incorporated herein by reference.

FIELD

The present disclosure relates to a linear conveyance device that moves a conveyance carrier along a stator-side platform by using a linear motor.

BACKGROUND

A linear conveyance device is a conveyance device including a base and a conveyance carrier that moves on the base, in which a stator disposed on the base and a mover disposed on the conveyance carrier constitute a linear motor, and a thrust is generated between the stator and the mover by controlling energization of the stator or the mover to drive the carrier. Regarding a shape of a track of the conveyance carrier, there is not only a straight track but also a curved track, a closed loop track obtained by combining these, and furthermore, there may be a divergence from a certain track to a plurality of different tracks.

In a linear motor conveyor system described in Patent Literature 1, magnetic elements for driving are attached to both side surfaces of a vertically long conveyance carrier, and rollers rotating in a horizontal plane are disposed above and below the magnetic elements. A stator-side platform which is a base is basically disposed in one of left and right directions perpendicular to both a traveling direction of the conveyance carrier and an upper-lower direction, and includes a magnetic element corresponding to the magnetic element disposed on the conveyance carrier, and upper and lower rails engaging with the upper and lower rollers. Note that any one of the upper and lower rollers and any one of the upper and lower rails have a U-shaped or V-shaped cross-sectional shape. With such a configuration, a behavior of the conveyance carrier in the upper-lower direction is constrained by the rollers and the rails, and a behavior thereof in a lateral direction with respect to the traveling direction is constrained by the rollers and the rails and a magnetic attraction force. At a divergence portion, there are stator-side platforms on both left and right sides of the conveyance carrier, and while the conveyance carrier is adsorbed to one of the left and right stator-side platforms by a magnetic force of the magnetic element of the stator-side platform on one or both of the left and right sides, the conveyance carrier is caused to travel along the stator-side platform to which the conveyance carrier is adsorbed. Consequently, track divergence is realized.

CITATION LIST

Patent Literature

Patent Literature 1: WO2018/161160 A

SUMMARY OF INVENTION

Problem to be Solved by the Invention

In the technique described in Patent Literature 1, when the conveyance carrier is in a "cantilever state" in which the conveyance carrier is supported by the magnetic attraction force between the conveyance carrier and one of the stator-side platforms on both the left and right sides, a problem is the balance of a rotational moment around a lowermost portion of an engagement surface between the lower roller and the lower rail. An overturning moment acts around the lowermost portion of the engagement surface, the overturning moment being a moment formed by the product of a load in the upper-lower direction such as gravity of the conveyance carrier and a horizontal distance from the lowermost portion of the engagement surface to a centroid position of the entire conveyance carrier. This overturning moment has an effect of overturning the conveyance carrier around the lowermost portion of the engagement surface. On the other hand, a counter moment is a moment formed by the product of a magnetic attraction force in the horizontal direction by the magnetic elements of the conveyance carrier and the stator-side platform and a distance in the upper-lower direction from the lowermost portion of the engagement surface to the center of the magnetic attraction force of the conveyance carrier. When the overturning moment exceeds the counter moment, the balance of the rotational moment around the lowermost portion of the engagement surface cannot be obtained, and thus the conveyance carrier overturns. In order to prevent such overturning of the conveyance carrier, the technique described in Patent Literature 1 needs to limit the weight or a centroid position of an object to be conveyed, which is a problem.

The present disclosure has been made in view of the above, and an object thereof is to provide a linear conveyance device capable of reducing overturning of a conveyance carrier due to an overturning moment derived from a load of the conveyance carrier in an upper-lower direction when the conveyance carrier is in a cantilever state.

Means to Solve the Problem

In order to solve the above-described problem and achieve the object, a linear conveyance device of the present disclosure is a device that moves a conveyance carrier that conveys an object by a linear motor along a stator-side platform disposed in a width direction perpendicular to both a traveling direction of the conveyance carrier and an upper-lower direction, and includes a portion where the stator-side platform is disposed on one side in the width direction The conveyance carrier includes: a conveyance carrier main structure that supports the object; a first roller provided on the conveyance carrier main structure; a second roller provided on the conveyance carrier main structure at a height different from a height where the first roller is provided; a mover-side magnetic element that is provided on a side surface on each of both sides of the conveyance carrier main structure in the width direction and drives the conveyance carrier main structure with respect to the stator-side platform; and a mover-side counter moment generating element that generates a counter moment against overturning of the conveyance carrier between the mover-side counter moment generating element and the stator-side platform. The stator-side platform includes: a first rail that is provided on a platform structure provided along a movement path of the conveyance carrier and engages with the first roller; a second rail that is provided on the platform structure and engages with the second roller; a stator-side magnetic element provided on the platform structure and paired with the mover-side magnetic element to generate a magnetic attraction force in a horizontal direction; and a stator-side counter moment generating element that is disposed on the platform structure and generates the counter moment between the stator-side counter moment generating element and the mover-side counter moment generating element paired therewith.

Effects of the Invention

The linear conveyance device according to the present disclosure achieves an effect that it is possible to reduce overturning of a conveyance carrier due to an overturning moment derived from a load of the conveyance carrier in an upper-lower direction when the conveyance carrier is in a cantilever state.

DESCRIPTION OF EMBODIMENTS

Hereinafter, a linear conveyance device according to each embodiment of the present disclosure will be described in detail with reference to the drawings.

First Embodiment

Figure 1:
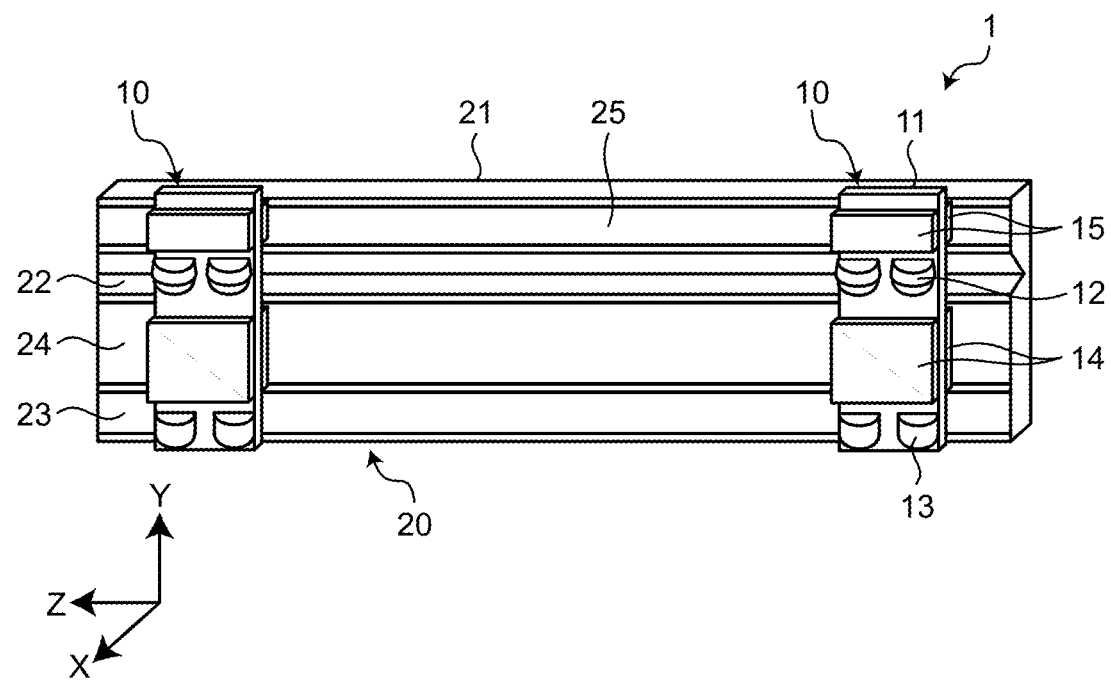
FIG. 1 is a perspective view illustrating an example of a configuration of a linear conveyance device according to a first embodiment.
Figure 2:
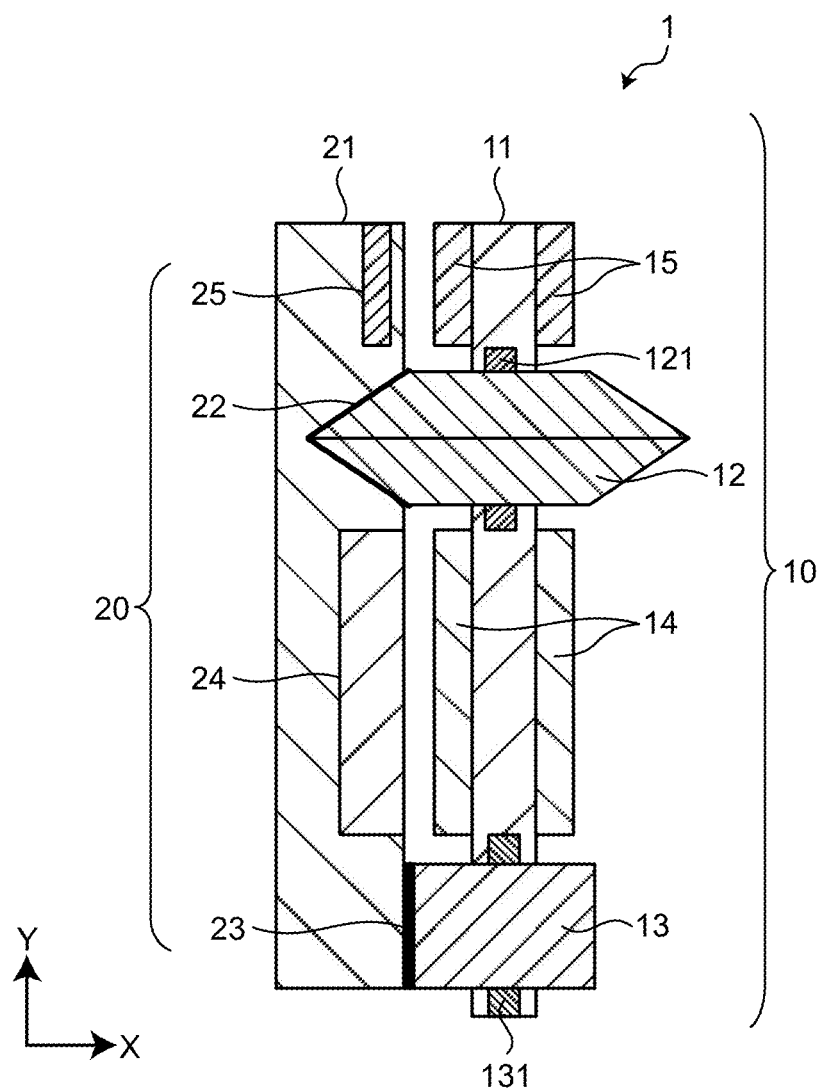
FIG. 2 is a cross-sectional view illustrating an example of the configuration of the linear conveyance device according to the first embodiment.

FIG. 1 is a perspective view illustrating an example of a configuration of a linear conveyance device according to a first embodiment, and FIG. 2 is a cross-sectional view illustrating an example of the configuration of the linear conveyance device according to the first embodiment. Hereinafter, a traveling direction of a conveyance carrier 10 is defined as a Z direction, an upper-lower direction is defined as a Y direction, and a direction perpendicular to two directions of the Z direction and the Y direction is defined as an X direction. The X direction is also referred to as a width direction. In one example, the Y direction is a vertical direction. Furthermore, in the following description, a relationship between two relative positions in the Y direction may be expressed by using "upper" or "lower". A linear conveyance device 1 is a device that moves the conveyance carrier 10 that conveys an object to be conveyed (not illustrated) by a linear motor along a stator-side platform 20 disposed in a width direction of the conveyance carrier 10, and includes a portion where the stator-side platform 20 is disposed on one side in the width direction. The linear conveyance device 1 includes the conveyance carrier 10 and the stator-side platform 20.

The conveyance carrier 10 includes a conveyance carrier main structure 11, upper V rollers 12, lower flat rollers 13, driving mover-side magnetic elements 14, and counter-moment-generating mover-side magnetic elements 15.

The conveyance carrier main structure 11 is a member that supports an object to be conveyed. Specifically, the conveyance carrier main structure 11 is a member on which the object to be conveyed can be placed or fixed along the stator-side platform 20. In the examples in FIGS. 1 and 2, the conveyance carrier main structure 11 is constituted with a plate-like member. In the conveyance carrier main structure 11, side surfaces which are surfaces parallel to the Z direction and the Y direction are larger than front and rear surfaces which are surfaces perpendicular to the Z direction and upper and lower surfaces which are surfaces perpendicular to the Y direction.

The upper V rollers 12 are provided at an upper portion of the conveyance carrier main structure 11. In the X direction, the size of the upper V rollers 12 is larger than the size of the conveyance carrier main structure 11. In FIGS. 1 and 2, the stator-side platform 20 is disposed only on one side of the conveyance carrier 10 in the X direction, but the stator-side platform 20 may be disposed on another side of the conveyance carrier 10 in the X direction or may be disposed on both sides thereof. Each of the upper V rollers 12 can abut on an upper V-groove rail 22 of the stator-side platform 20 regardless of the side of the conveyance carrier 10 in the X direction on which the stator-side platform 20 is present. In the example in FIG. 1, two upper V rollers 12 are provided at an interval in the Z direction, but there may be any number of upper V rollers 12. Each upper V roller 12 is supported by a rotation axis 121 provided at the upper portion of the conveyance carrier main structure 11 and rotates around the rotation axis 121. The rotation axis 121 extends in the Y direction. That is, the upper V roller 12 rotates in a horizontal plane. In a cross section of the upper V roller 12 passing through the rotation axis 121, the shape of a rolling surface present in a radially peripheral edge portion is a V shape fitted to a rail of the stator-side platform 20 to be described later.

The lower flat rollers 13 are provided at a lower portion of the conveyance carrier main structure 11. In the X direction, the size of the lower flat rollers 13 is larger than the size of the conveyance carrier main structure 11. Consequently, similarly to the case of the upper V rollers 12, each of the lower flat rollers 13 can abut on a lower flat rail 23 of the stator-side platform 20 regardless of the side of the conveyance carrier 10 in the X direction on which the stator-side platform 20 is present. In the example in FIG. 1, two lower flat rollers 13 are provided at an interval in the Z direction, but there may be any number of lower flat rollers 13. Each lower flat roller 13 is supported by a rotation axis 131 provided at the lower portion of the conveyance carrier main structure 11 and rotates around the rotation axis 131. The rotation axis 131 extends in the Y direction. That is, the lower flat roller 13 rotates in a horizontal plane. In a cross section of the lower flat roller 13 passing through the rotation axis 131, the shape of a rolling surface present in a radially peripheral edge portion is flat.

Here, the upper V rollers 12 each correspond to a first roller provided on the conveyance carrier main structure 11, and the lower flat rollers 13 each correspond to a second roller provided on the conveyance carrier main structure 11 at a height different from a height where the first roller is provided. In addition, the upper V rollers 12 each correspond to a V roller, and the lower flat rollers 13 each correspond to a flat roller. In FIGS. 1 and 2, the upper V rollers 12 are disposed above the lower flat rollers 13, but a vertical relationship between the upper V rollers 12 and the lower flat rollers 13 may be opposite. In that case, the conveyance carrier main structure 11 includes upper flat rollers and lower V rollers.

The driving mover-side magnetic elements 14 are provided on side surfaces on both sides of the conveyance carrier main structure 11 in the X direction, and drive the conveyance carrier main structure 11 with respect to the stator-side platform 20. In the examples in FIGS. 1 and 2, the driving mover-side magnetic elements 14 are provided on side surfaces on both sides of the conveyance carrier main structure 11 in the X direction between the upper V rollers 12 and the lower flat rollers 13. In one example, the driving mover-side magnetic elements 14 are permanent magnets or electromagnets. The driving mover-side magnetic elements 14 correspond to mover-side magnetic elements.

The counter-moment-generating mover-side magnetic elements 15 are disposed on upper portions of the side surfaces on both sides of the conveyance carrier main structure 11 in the X direction, and each generate a counter moment against overturning of the conveyance carrier 10 between the counter-moment-generating mover-side magnetic element 15 and the stator-side platform 20. Specifically, when the conveyance carrier 10 is in a "cantilever state", the counter-moment-generating mover-side magnetic elements 15 generate, with respect to the conveyance carrier 10, a counter moment which is a moment against an overturning moment derived from a load of the conveyance carrier 10 in the upper-lower direction. In the examples in FIGS. 1 and 2, the counter-moment-generating mover-side magnetic elements 15 are provided above the upper V rollers 12. In one example, the counter-moment-generating mover-side magnetic elements 15 are permanent magnets or electromagnets. The permanent magnets and the electromagnets are examples of magnetic elements. The counter-moment-generating mover-side magnetic elements 15 correspond to mover-side counter moment generating elements.

The stator-side platform 20 includes a platform structure 21, the upper V-groove rail 22, the lower flat rail 23, a driving stator-side magnetic element 24, and a counter-moment-generating stator-side magnetic element 25.

The platform structure 21 is a support member that supports the conveyance carrier 10 while moving the conveyance carrier 10. The platform structure 21 is provided along a movement path of the conveyance carrier 10.

The upper V-groove rail 22 is a rail provided on an upper portion of the platform structure 21 and having a V-shaped running surface. The upper V-groove rail 22 is provided at a position corresponding to the upper V rollers 12 of the conveyance carrier 10 and engages with the upper V rollers 12.

The lower flat rail 23 is a rail provided at a lower portion of the platform structure 21 and having a flat running surface. The lower flat rail 23 is provided at a position corresponding to the lower flat rollers 13 of the conveyance carrier 10 on a main surface of the platform structure 21 on a side on which the conveyance carrier 10 is disposed, and engages with the lower flat rollers 13.

Here, the upper V-groove rail 22 is provided on the platform structure 21 and corresponds to a first rail engaging with the upper V rollers 12 which are first rollers, and the lower flat rail 23 is provided on the platform structure 21 and corresponds to a second rail engaging with the lower flat rollers 13 which are second rollers. In addition, the upper V-groove rail 22 corresponds to a V-groove rail, and the lower flat rail 23 corresponds to a flat rail. Note that the V-groove rail and the flat rail are provided to be aligned with the positions of the V rollers and the flat rollers of the conveyance carrier 10. Therefore, in a case where the vertical relationship between the upper V rollers 12 and the lower flat rollers 13 is opposite in the conveyance carrier 10, the vertical relationship between the upper V-groove rail 22 and the lower flat rail 23 is opposite in the stator-side platform 20, as well.

The driving stator-side magnetic element 24 is paired with the driving mover-side magnetic element 14 to generate a magnetic attraction force in the horizontal direction. In the examples in FIGS. 1 and 2, the driving stator-side magnetic element 24 is provided on a side surface of the platform structure 21 between the upper V-groove rail 22 and the lower flat rail 23, the side surface facing the conveyance carrier 10. In one example, the driving stator-side magnetic element 24 is a permanent magnet or an electromagnet. The driving stator-side magnetic element 24 corresponds to a stator-side magnetic element.

The counter-moment-generating stator-side magnetic element 25 is disposed on an upper portion of the platform structure 21 and generates a counter moment by an attraction force in the horizontal direction generated between the counter-moment-generating stator-side magnetic element 25 and the counter-moment-generating mover-side magnetic element 15 paired therewith. In the examples in FIGS. 1 and 2, the counter-moment-generating stator-side magnetic element 25 is provided above the upper V-groove rail 22, on a side surface of the platform structure 21 on a side on which the conveyance carrier 10 is disposed. In one example, the counter-moment-generating stator-side magnetic element 25 is an electromagnet or a permanent magnet. The permanent magnets and the electromagnets are examples of magnetic elements. The counter-moment-generating stator-side magnetic element 25 is disposed on the platform structure 21 and corresponds to a stator-side counter moment generating element that generates a counter moment between the stator-side counter moment generating element and the counter-moment-generating mover-side magnetic element 15 which is a mover-side counter moment generating element paired therewith.

The stator-side platform 20 may include a divergence portion. The stator-side platform 20 is disposed on each of both sides of the conveyance carrier 10 in the X direction at the divergence portion, and is disposed on one side of the conveyance carrier 10 in the X direction at a portion other than the divergence portion.

Here, the upper V rollers 12 of the conveyance carrier 10 are engaged with the upper V-groove rail 22 of the stator-side platform 20, and the lower flat rollers 13 of the conveyance carrier 10 are engaged with the lower flat rail 23 of the stator-side platform 20, and thereby the conveyance carrier 10 can move along the stator-side platform 20. The driving mover-side magnetic elements 14 and the driving stator-side magnetic element 24 constitute a linear motor. In that case, the driving mover-side magnetic elements 14 and/or the driving stator-side magnetic element 24 is an electromagnet. Control of energization of the linear motor by a control device (not illustrated) makes it possible to control a drive thrust in the Z direction which is a direction in which the stator-side platform 20 extends and the magnetic attraction force in the X direction.

The behavior of the conveyance carrier 10 in the upper-lower direction is constrained by the upper V rollers 12 disposed on the conveyance carrier 10 and the upper V-groove rail 22 on the stator-side platform 20 engaging with the upper V rollers 12. In addition, the upper V rollers 12 and the lower flat rollers 13 of the conveyance carrier 10 come into contact with the upper V-groove rail 22 and the lower flat rail 23, respectively, and the magnetic attraction force is generated toward the left side in FIG. 2, that is, the negative side in the X direction so as to press the conveyance carrier 10 against the stator-side platform 20 in the figure by the driving mover-side magnetic element 14 and the driving stator-side magnetic element 24, and thereby the behavior of the conveyance carrier 10 in the lateral direction is constrained. Configurations and operations in the first embodiment described here are the same as those in Patent Literature 1.

However, in the first embodiment, the conveyance carrier 10 includes the counter-moment-generating mover-side magnetic elements 15 which are attraction force generating elements at upper portions of the conveyance carrier main structure 11, and the stator-side platform 20 includes the counter-moment-generating stator-side magnetic element 25 which is an attraction force generating element at the upper portion of the platform structure 21. A magnetic attraction force in the horizontal direction is generated between the counter-moment-generating mover-side magnetic element 15 and the counter-moment-generating stator-side magnetic element 25. That is, in a case where the stator-side platform 20 is disposed on one side of the conveyance carrier 10 in the X direction, in one example, in a case where the conveyance carrier 10 is present at a position of a portion other than the divergence portion, the counter-moment-generating mover-side magnetic element 15 generates an attraction force between the counter-moment-generating mover-side magnetic element 15 and the counter-moment-generating stator-side magnetic element 25. Consequently, the upper portion of the conveyance carrier 10 is attracted to the stator-side platform 20, and it is possible to reduce the overturning of the conveyance carrier 10 due to the overturning moment derived from the load thereof in the upper-lower direction when the conveyance carrier 10 is in the "cantilever state". Note that the counter-moment-generating mover-side magnetic elements 15 and/or the counter-moment-generating stator-side magnetic element 25 may be an electromagnet, and the control device may control energization of the electromagnet in synchronization with the control of energization of the linear motor.

In FIGS. 1 and 2, the case where the attraction force generating element is a magnetic element is taken as an example, but the attraction force generating element may be an element other than the magnetic element and based on another method. There is a method using air pressure as an attraction force generating element. In one example, it is a case of providing, at an upper portion of the conveyance carrier 10, an attraction force generating element that sucks air between the upper portion of the conveyance carrier 10 and the upper portion of the stator-side platform 20. Compared with such a method using air pressure or the like, the method using a magnetic element eliminates the necessity of electric power or the like in generating the attraction force.

Figure 3:
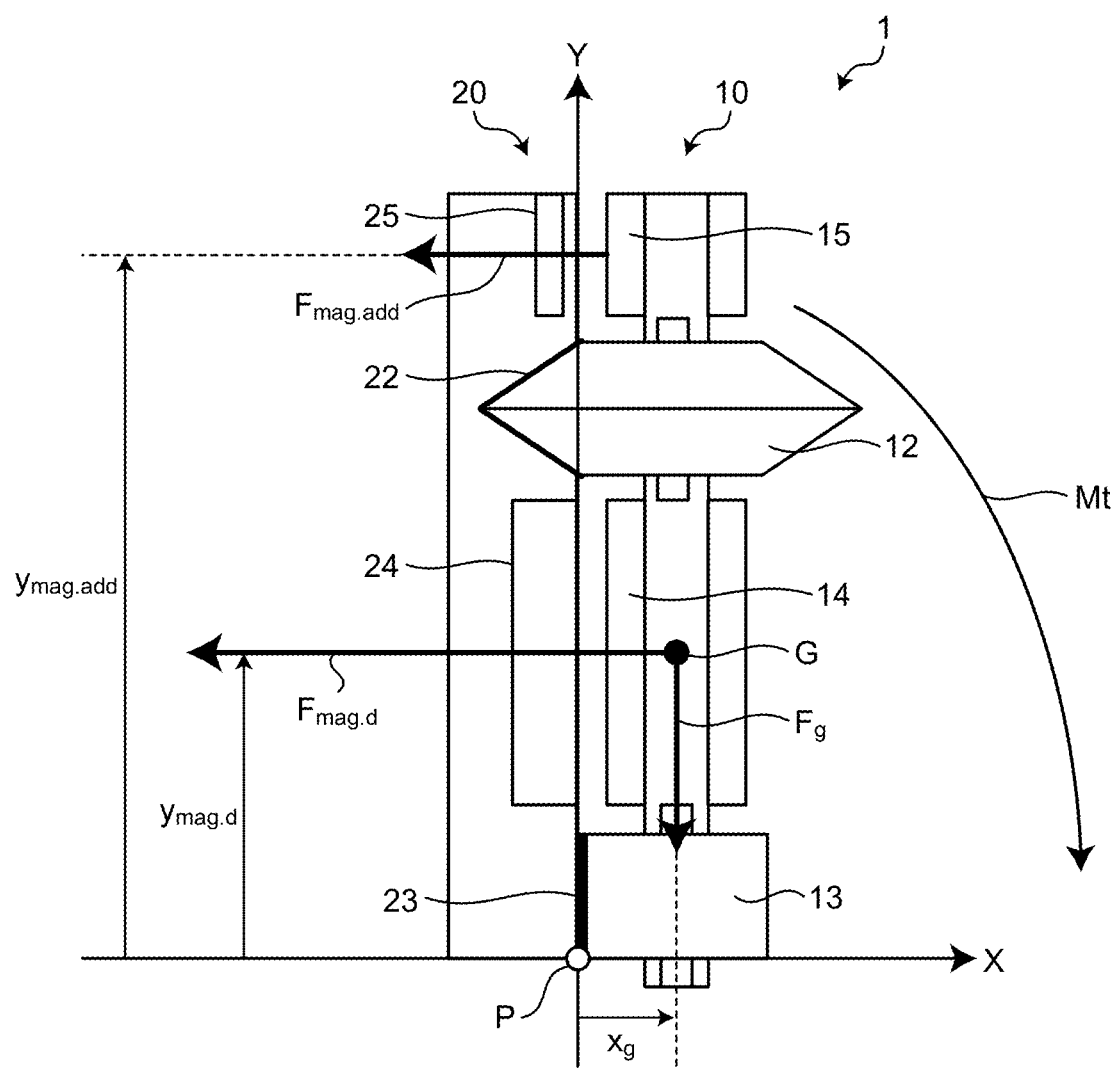
FIG. 3 is a diagram for explaining an effect of the linear conveyance device according to the first embodiment.

FIG. 3 is a diagram for explaining an effect of the linear conveyance device according to the first embodiment. Here, consider the balance of a rotational moment around a point P which is a lowermost portion of an engagement surface between the lower flat roller 13 and the lower flat rail 23 depicted in FIG. 3. The point P corresponds to a rotation center which is a center of the conveyance carrier 10 when the conveyance carrier 10 being in contact with the stator-side platform 20 overturns. An overturning moment Mt acts around the point P, the overturning moment Mt being a moment formed by the product of a gravity $F_g$ of the conveyance carrier 10 in the Y direction which is the upper-lower direction and a horizontal distance $x_g$ from the point P to a centroid position G of the entire conveyance carrier 10. In this example, the horizontal distance $x_g$ is a distance in the X direction. The overturning moment Mt has an effect of overturning the conveyance carrier 10 around the point P. In Patent Literature 1, a counter moment with respect to the overturning moment Mt is a moment formed by the product of a magnetic attraction force $F_{mag.d}$ in the horizontal direction by the driving mover-side magnetic element 14 and the driving stator-side magnetic element 24 and a distance $y_{mag.d}$ in the Y direction from the point P to the center of the magnetic attraction force $F_{mag.d}$ of the conveyance carrier 10. However, in Patent Literature 1, when the overturning moment Mt exceeds the counter moment, the conveyance carrier 10 overturns. Therefore, in Patent Literature 1, it is necessary to limit the weight of the object to be conveyed or the horizontal distance $x_g$ between the centroid position of the conveyance carrier 10 and the point P.

On the other hand, in the first embodiment, a magnetic attraction force $F_{mag.add}$ in the horizontal direction is generated between the counter-moment-generating mover-side magnetic element 15 and the counter-moment-generating stator-side magnetic element 25 disposed on upper portions of the conveyance carrier 10 and the stator-side platform 20, respectively. Consequently, it is possible to increase the counter moment with respect to the overturning moment Mt.

A condition for preventing the above-described overturning of the conveyance carrier 10 is formulated. The condition for preventing the overturning of the conveyance carrier 10 is that the following formula (1) is established in which the gravity applied to the conveyance carrier 10 is denoted by $F_g$, the horizontal distance from the point P to the centroid position G of the entire conveyance carrier 10 is denoted by $x_g$, the magnetic attraction force in the horizontal direction by the driving mover-side magnetic element 14 and the driving stator-side magnetic element 24 is denoted by $F_{mag.d}$, the distance in the Y direction which is the upper-lower direction from the point P to the center of the magnetic attraction force $F_{mag.d}$ of the conveyance carrier 10 is denoted by $y_{mag.d}$, the magnetic attraction force in the horizontal direction between the counter-moment-generating mover-side magnetic element 15 and the counter-moment-generating stator-side magnetic element 25 is denoted by $F_{mag.add}$, and a distance in the Y direction from the point P to the center of the magnetic attraction force $F_{mag.add}$ by the counter moment generating elements is denoted by $y_{mag.add}$.

$$x_g F_g < y_{mag.d} F_{mag.d} + y_{mag.add} F_{mag.add} \quad (1)$$

As can be seen from the formula (1), in order to greatly alleviate the limit on the weight of the object to be conveyed or the distance between the centroid position of the conveyance carrier 10 and the point P, it is only required to increase the magnetic attraction force $F_{mag.add}$ in the counter moment generating elements, or to increase the distance $y_{mag.add}$ from the point P to the center of the magnetic attraction force $F_{mag.add}$ of the counter moment generating elements.

In one example, the attraction force between the counter-moment-generating mover-side magnetic element 15 and the counter-moment-generating stator-side magnetic element 25 and the distance in the Y direction between the center of the attraction force and the point P are determined on the basis of the magnetic attraction force between the driving mover-side magnetic elements 14 and the driving stator-side magnetic element 24 and the distance in the Y direction between the center of the magnetic attraction force and the point P.

Figure 4:
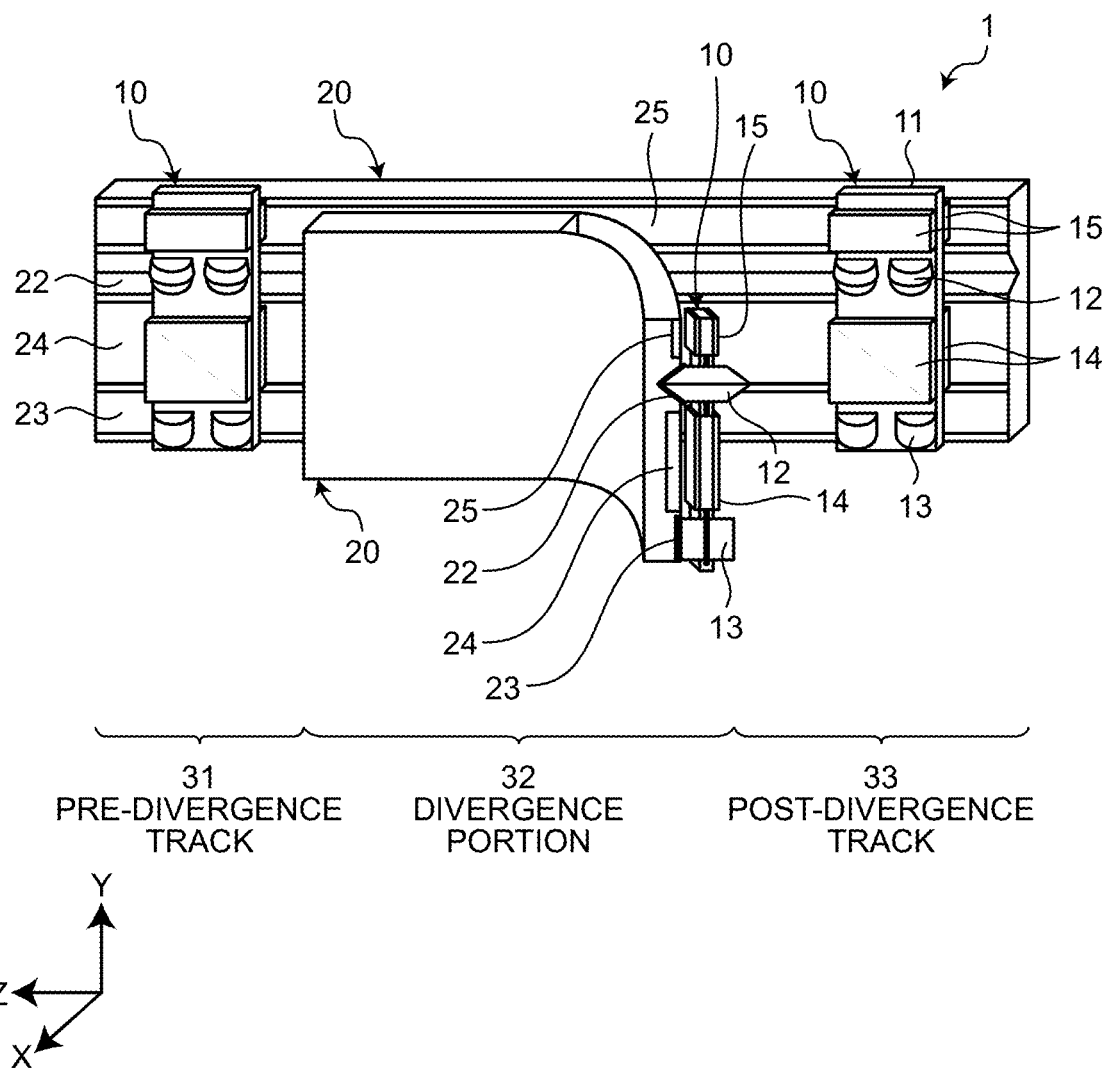
FIG. 4 is an overhead view illustrating an example of a vicinity of a divergence portion of the linear conveyance device according to the first embodiment.

FIG. 4 is an overhead view illustrating an example of a vicinity of a divergence portion of the linear conveyance device according to the first embodiment. In the first embodiment, at a divergence portion 32, the stator-side platforms 20 are present on both sides of the conveyance carrier 10 in the X direction. At the divergence portion 32, the conveyance carrier 10 is controlled by a control device (not illustrated) so as not to be adsorbed to the stator-side platforms 20 on both sides at the same time but to be adsorbed to one of the stator-side platforms 20. In a case where the conveyance carrier 10 is in the "cantilever state", such as cases of a pre-divergence track 31 which is a track preceding the divergence portion 32 and a post-divergence track 33 which is a track succeeding the divergence portion 32, the magnetic attraction force is generated by the driving mover-side magnetic element 14 and the driving stator-side magnetic element 24 so as to press the conveyance carrier 10 against the stator-side platform 20, and thereby the behavior of the conveyance carrier 10 in the lateral direction with respect to the traveling direction is constrained. This is the same configuration and operation as those in Patent Literature 1.

In the first embodiment, the conveyance carrier 10 includes the counter-moment-generating mover-side magnetic elements 15 on the upper portion thereof, and the stator-side platform 20 on the entire track includes the counter-moment-generating stator-side magnetic element 25 on the upper portion thereof. Then, except the divergence portion 32, on the pre-divergence track 31 and the post-divergence track 33, the magnetic attraction force is always generated between the counter-moment-generating mover-side magnetic element 15 of the conveyance carrier 10 and the counter-moment-generating stator-side magnetic element 25 of the stator-side platform 20. Consequently, the overturning moment generated by the load of the conveyance carrier 10 in the upper-lower direction is canceled by a counter moment including a moment generated by the magnetic attraction force generated between the driving mover-side magnetic element 14 and the driving stator-side magnetic element 24 and a moment generated by the magnetic attraction force generated between the counter-moment-generating mover-side magnetic element 15 and the counter-moment-generating stator-side magnetic element 25. As a result, an effect is achieved that it is possible to reduce the overturning of the conveyance carrier 10 due to the overturning moment derived from the load of the conveyance carrier 10 in the upper-lower direction when the conveyance carrier 10 is in the "cantilever state".

Second Embodiment

A load in the upper-lower direction is always applied to the conveyance carrier 10 by gravity or the like. Depending on the weight of an object to be conveyed, in the technique described in Patent Literature 1, a U or V roller that receives a load in the upper-lower direction may fall off or wear severely. Therefore, Prior Art 1 described below discloses a linear motor in which stator-side platforms are always disposed on both sides of a conveyance carrier on all tracks except a divergence portion, and upper and lower rollers disposed on both sides of the conveyance carrier in a width direction are engaged with respective rails of the stator-side platforms on both sides thereof in the width direction. Furthermore, in Prior Art 1, a structure is employed in which rollers are added to upper portions of the conveyance carrier on both left and right sides thereof, the rollers engaging with rails added to upper surfaces of the stator-side platforms and supporting the conveyance carrier in the upper-lower direction, thereby improving support load bearing of the conveyance carrier in the upper-lower direction.

(Prior Art 1) US 2020/0028427 A

In the technique described in Prior Art 1, on portions of tracks other than the divergence portion, the conveyance carrier is in a "doubly-supported state" in which rollers on both side surfaces of the conveyance carrier in the width direction engage with rails provided on the stator-side platforms on both sides of the conveyance carrier in the width direction, and the conveyance carrier does not overturn. However, at the divergence portion, the stator-side platforms on both sides of the conveyance carrier in the width direction diverge, and the conveyance carrier is temporarily adsorbed only to one of the stator-side platforms by the magnetic attraction force of the magnetic element of the stator-side platform on one side. At that time, on an opposite side, the roller for supporting the load in the upper-lower direction does not engage with the rail, and the conveyance carrier is in the "cantilevered state" in which the load in the upper-lower direction is supported only by the rail of the stator-side platform on an adsorption side and the roller engaging therewith.

In the technique described in Prior Art 1, when the conveyance carrier is in the "cantilevered state" at the divergence portion, there occurs a problem of the balance of a rotational moment around a lowermost portion of an engagement surface between a lower roller and a lower rail. Although there is an effect that a frictional force in the horizontal direction between the added roller and rail becomes a counter moment, since the frictional force itself in the horizontal direction is small, an effect of reducing the overturning of the conveyance carrier cannot be expected. Therefore, in a second embodiment, a description will be given for a linear conveyance device capable of reducing the overturning of the conveyance carrier due to an overturning moment derived from a load in the upper-lower direction of the conveyance carrier in a case where the conveyance carrier is in the "cantilever state" in the technique described in the Prior Art 1.

Figure 5:
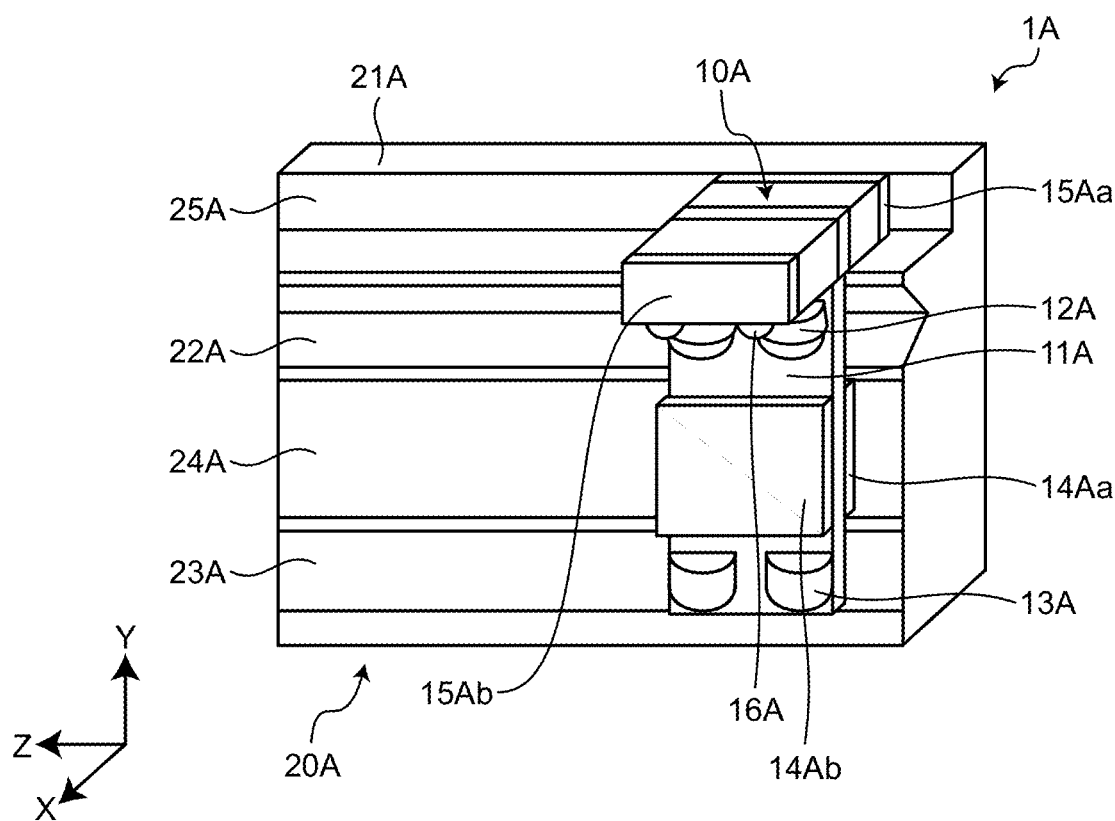
FIG. 5 is a perspective view illustrating an example of a configuration of a linear conveyance device according to a second embodiment.
Figure 6:
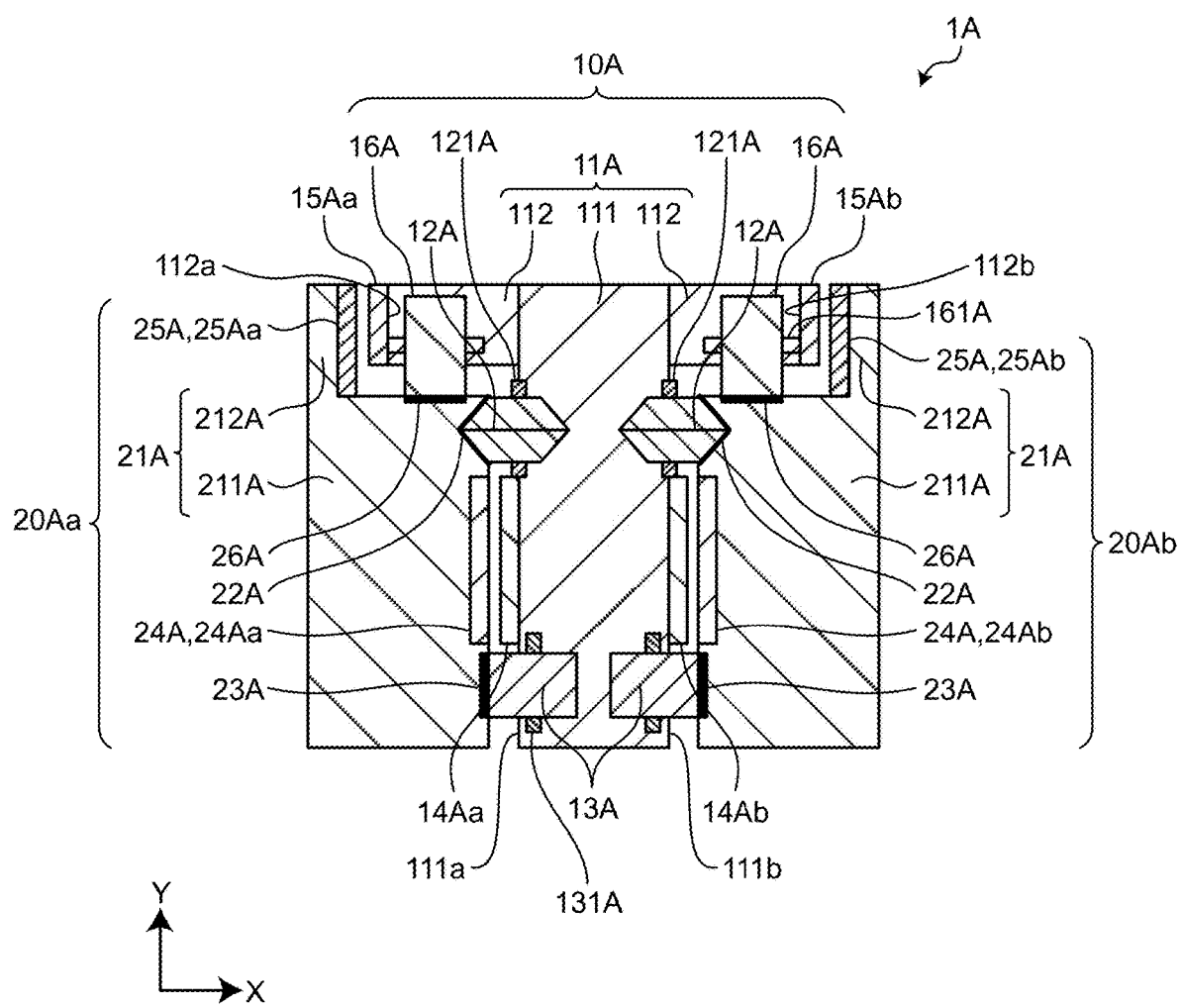
FIG. 6 is a cross-sectional view illustrating an example of the configuration of the linear conveyance device according to the second embodiment, taken at a position of a portion other than the divergence portion.
Figure 7:
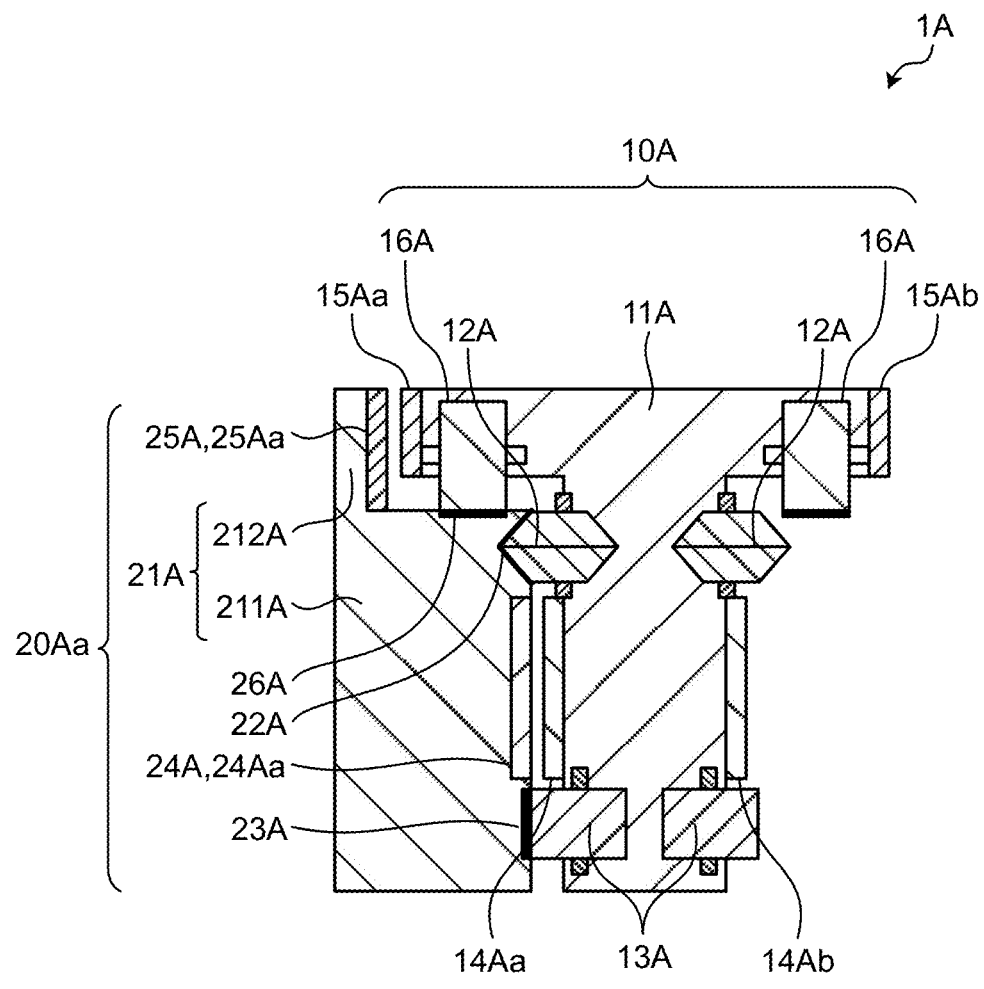
FIG. 7 is a cross-sectional view illustrating an example of the configuration of the linear conveyance device according to the second embodiment, taken at a position of the divergence portion.

FIG. 5 is a perspective view illustrating an example of a configuration of a linear conveyance device according to the second embodiment. FIG. 6 is a cross-sectional view illustrating an example of the configuration of the linear conveyance device according to the second embodiment, taken at a position of a portion other than the divergence portion. FIG. 7 is a cross-sectional view illustrating an example of the configuration of the linear conveyance device according to the second embodiment, taken at a position of the divergence portion. FIG. 5 illustrates a state of a linear conveyance device 1A at the divergence portion. FIGS. 6 and 7 each illustrate a cross section perpendicular to the Z direction. In the linear conveyance device 1A of the second embodiment, a conveyance carrier 10A is in the "doubly-supported state" in which the conveyance carrier 10A is supported by stator-side platforms 20Aa and 20Ab on both sides in the X direction as illustrated in FIG. 6 at a portion other than the divergence portion, and the conveyance carrier 10A is in the "cantilever state" in which the conveyance carrier 10A is supported by the stator-side platform 20Aa on one side in the X direction as illustrated in FIGS. 5 and 7 at the divergence portion. The linear conveyance device 1A includes the conveyance carrier 10A and the stator-side platforms 20Aa and 20Ab.

The conveyance carrier 10A includes a conveyance carrier main structure 11A, upper V rollers 12A, lower flat rollers 13A, driving mover-side magnetic elements 14Aa and 14Ab, counter-moment-generating mover-side magnetic elements 15Aa and 15Ab, and additional rollers 16A.

The conveyance carrier main structure 11A is a member that supports an object to be conveyed. In the examples in FIGS. 5 to 7, the conveyance carrier main structure 11A has a T shape when viewed from the Z direction. The conveyance carrier main structure 11A includes a main body portion 111 having a plate shape in which a YZ plane has an area larger than other planes, and two overhanging portions 112 having a plate shape provided on upper end portions of the main body portion 111 so as to protrude to both sides thereof in the X direction.

The upper V rollers 12A are provided on both sides of the conveyance carrier main structure 11A in the X direction, and each rotate around a rotation axis 121A which is an axis extending in the Y direction. In the examples in FIGS. 5 to 7, the upper V rollers 12A are provided at an upper portion of the conveyance carrier main structure 11A. Specifically, the upper V rollers 12A are provided on side surfaces of the main body portion 111 perpendicular to the X direction below the overhanging portions 112 of the conveyance carrier main structure 11A. Two upper V rollers 12A are provided at an interval in the X direction, and two upper V rollers 12A are provided at an interval in the Z direction. That is, four upper V rollers 12A are provided. However, the number of upper V rollers 12A is not limited. Each upper V roller 12A is supported by the rotation axis 121A provided at an upper portion of the main body portion 111 of the conveyance carrier main structure 11A. The upper V roller 12A rotates in a horizontal plane. In a cross section of the upper V roller 12A passing through the rotation axis 121A, the shape of a rolling surface present in a radially peripheral edge portion is a V shape fitted to a rail of the stator-side platform 20A to be described later.

The lower flat rollers 13A are provided on both sides of the conveyance carrier main structure 11A in the X direction, and each rotate around a rotation axis 131A which is an axis extending in the Y direction. In the examples in FIGS. 5 to 7, the lower flat rollers 13A are provided at a lower portion of the main body portion 111 of the conveyance carrier main structure 11A. Two lower flat rollers 13A are provided at an interval in the X direction, and two lower flat rollers 13A are provided at an interval in the Z direction. That is, four lower flat rollers 13A are provided. However, the number of lower flat rollers 13A is not limited. Each lower flat roller 13A is supported by the rotation axis 131A provided at a lower portion of the main body portion 111 of the conveyance carrier main structure 11A. The lower flat roller 13A rotates in a horizontal plane. In a cross section of the lower flat roller 13A passing through the rotation axis 131A, the shape of a rolling surface present in a radially peripheral edge portion is flat.

Here, the upper V rollers 12A each correspond to a first roller provided on the conveyance carrier main structure 11A, and the lower flat rollers 13A each correspond to a second roller provided on the conveyance carrier main structure 11A at a height different from a height where the first roller is provided. In addition, the upper V rollers 12A each correspond to a V roller, and the lower flat rollers 13A each correspond to a flat roller. In FIGS. 5 to 7, the upper V rollers 12A are disposed above the lower flat rollers 13A, but a vertical relationship between the upper V rollers 12A and the lower flat rollers 13A may be opposite. In that case, the conveyance carrier main structure 11A includes upper flat rollers and lower V rollers.

The driving mover-side magnetic element 14Aa is provided on a side surface 111a of the conveyance carrier main structure 11A in the X direction, and drives the conveyance carrier main structure 11A with respect to the stator-side platform 20Aa. In the examples in FIGS. 5 to 7, the driving mover-side magnetic element 14Aa is provided on the side surface 111a of the main body portion 111 of the conveyance carrier main structure 11A in the X direction between the upper V roller 12A and the lower flat roller 13A. The driving mover-side magnetic element 14Ab is provided on a side surface 111b of the conveyance carrier main structure 11A in the X direction, and drives the conveyance carrier main structure 11A with respect to the stator-side platform 20Ab. In the examples in FIGS. 5 to 7, the driving mover-side magnetic element 14Ab is provided on the side surface 111b of the main body portion 111 of the conveyance carrier main structure 11A perpendicular to the X direction between the upper V roller 12A and the lower flat roller 13A. In one example, the driving mover-side magnetic elements 14Aa and 14Ab are permanent magnets or electromagnets. The driving mover-side magnetic elements 14Aa and 14Ab correspond to mover-side magnetic elements. Note that, in the following description, the driving mover-side magnetic element 14Aa and the driving mover-side magnetic element 14Ab are each referred to as a driving mover-side magnetic element 14A when not being individually distinguished.

The counter-moment-generating mover-side magnetic element 15Aa is disposed on a side surface 112a at an upper portion of the conveyance carrier main structure 11A in the X direction, and generates a counter moment against overturning of the conveyance carrier 10A between the counter-moment-generating mover-side magnetic element 15Aa and the stator-side platform 20Aa. Specifically, the counter-moment-generating mover-side magnetic element 15Aa is provided on the side surface 112a of the overhanging portion 112 of the conveyance carrier main structure 11A perpendicular to the X direction. The counter-moment-generating mover-side magnetic element 15Ab is disposed on a side surface 112b at an upper portion of the conveyance carrier main structure 11A in the X direction, and generates a counter moment against overturning of the conveyance carrier 10A between the counter-moment-generating mover-side magnetic element 15Ab and the stator-side platform 20Ab. Specifically, the counter-moment-generating mover-side magnetic element 15Ab is provided on the side surface 112b of the overhanging portion 112 of the conveyance carrier main structure 11A perpendicular to the X direction. In one example, the counter-moment-generating mover-side magnetic elements 15Aa and 15Ab are electromagnets or permanent magnets. When the conveyance carrier 10A is in the "cantilever state", the counter-moment-generating mover-side magnetic elements 15Aa and 15Ab generate, with respect to the conveyance carrier 10A, a counter moment which is a moment against an overturning moment derived from a load of the conveyance carrier 10A in the upper-lower direction. The counter-moment-generating mover-side magnetic elements 15Aa and 15Ab correspond to mover-side counter moment generating elements. Note that, in the following description, the counter-moment-generating mover-side magnetic element 15Aa and the counter-moment-generating mover-side magnetic element 15Ab are each referred to as a counter-moment-generating mover-side magnetic element 15A when not being individually distinguished.

The additional rollers 16A are provided on both sides of the conveyance carrier main structure 11A in the X direction, and each rotate around a rotation axis 161A which is an axis extending in the X direction. In the examples in FIGS. 5 to 7, the additional rollers 16A are provided at lower surfaces of the overhanging portions 112 of the conveyance carrier main structure 11A. Two additional rollers 16A are provided at an interval in the Z direction in each of the overhanging portions 112. However, the number of additional rollers 16A is not limited. Each additional roller 16A is supported by the rotation axis 161A provided at the overhanging portion 112. The additional roller 16A rotates in a YZ plane. In a cross section of the additional roller 16A passing through the rotation axis 161A, the shape of a rolling surface present in a radially peripheral edge portion is flat.

In the second embodiment, the stator-side platforms 20Aa and 20Ab are provided on both sides of the conveyance carrier 10A in the X direction at a portion other than the divergence portion. That is, on the stator-side platforms 20Aa and 20Ab, the conveyance carrier 10A is in the "doubly-supported state" at a portion other than the divergence portion. Therefore, there are the stator-side platform 20Aa facing the side surface 111a of the main body portion 111 and the stator-side platform 20Ab facing the side surface 111b of the main body portion 111. Note that, in the following description, the stator-side platform 20Aa and the stator-side platform 20Ab are each referred to as a stator-side platform 20A when not being individually distinguished.

The stator-side platform 20A includes a platform structure 21A, an upper V-groove rail 22A, a lower flat rail 23A, a driving stator-side magnetic element 24A, a counter-moment-generating stator-side magnetic element 25A, and an additional rail 26A.

The platform structure 21A is a support member that supports the conveyance carrier 10A while moving the conveyance carrier 10A. The platform structure 21A is provided along a movement path of the conveyance carrier 10A. In the second embodiment, the platform structure 21A includes a main body portion 211A and a side wall portion 212A provided on an upper portion of the main body portion 211A on a side opposite to a side where the conveyance carrier 10A is disposed. The side wall portion 212A is provided on an upper surface of the main body portion 211A so as to protrude in the Y direction. The overhanging portions 112 of the conveyance carrier main structure 11A can each pass through a space above the main body portion 211A surrounded by the upper surface of the main body portion 211A and the side wall portion 212A.

The upper V-groove rail 22A is a rail provided on an upper portion of the main body portion 211A of the platform structure 21A and having a V-shaped running surface. The upper V-groove rail 22A is provided at a position corresponding to the upper V rollers 12A of the conveyance carrier 10A and engages with the upper V rollers 12A.

The lower flat rail 23A is a rail provided at a lower portion of the main body portion 211A of the platform structure 21A and having a flat running surface. The lower flat rail 23A is provided on a side surface of the platform structure 21A at a position corresponding to the lower flat rollers 13A of the conveyance carrier 10A, the side surface facing the conveyance carrier 10A, and engages with the lower flat rollers 13A.

Here, the upper V-groove rail 22A is provided on the platform structure 21A and corresponds to a first rail engaging with the upper V rollers 12A which are first rollers, and the lower flat rail 23A is provided on the platform structure 21A and corresponds to a second rail engaging with the lower flat rollers 13A which are second rollers. In addition, the upper V-groove rail 22A corresponds to a V-groove rail, and the lower flat rail 23A corresponds to a flat rail. Note that the V-groove rail and the flat rail are provided to be aligned with the positions of the V rollers and the flat rollers of the conveyance carrier 10A. Therefore, in a case where the vertical relationship between the upper V rollers 12A and the lower flat rollers 13A is opposite in the conveyance carrier 10A, the vertical relationship between the upper V-groove rail 22A and the lower flat rail 23A is opposite in the stator-side platform 20A, as well.

The driving stator-side magnetic element 24A is paired with the driving mover-side magnetic element 14A to generate a magnetic attraction force in the horizontal direction. In the examples in FIGS. 5 to 7, the driving stator-side magnetic element 24A is provided on a side surface of the main body portion 211A of the platform structure 21A between the upper V-groove rail 22A and the lower flat rail 23A, the side surface facing the conveyance carrier 10A. In one example, the driving stator-side magnetic element 24A is a permanent magnet or an electromagnet. Note that, in the following description, in a case where the driving stator-side magnetic element 24A of the stator-side platform 20Aa and that of the stator-side platform 20Ab are distinguished from each other, the driving stator-side magnetic element 24A of the stator-side platform 20Aa is referred to as a driving stator-side magnetic element 24Aa, and the driving stator-side magnetic element 24A of the stator-side platform 20Ab is referred to as a driving stator-side magnetic element 24Ab. The driving stator-side magnetic elements 24A correspond to stator-side magnetic elements.

The counter-moment-generating stator-side magnetic element 25A is disposed on an upper portion of the platform structure 21A and generates a counter moment by an attraction force in the horizontal direction generated between the counter-moment-generating stator-side magnetic element 25A and the counter-moment-generating mover-side magnetic element 15A paired therewith. In the examples in FIGS. 5 to 7, the counter-moment-generating stator-side magnetic element 25A is provided on a side surface of the side wall portion 212A of the platform structure 21A, the side surface facing the conveyance carrier 10A. In one example, the counter-moment-generating stator-side magnetic element 25A is an electromagnet or a permanent magnet. The counter-moment-generating stator-side magnetic element 25A is disposed on the platform structure 21A and corresponds to a stator-side counter moment generating element that generates a counter moment between the stator-side counter moment generating element and the counter-moment-generating mover-side magnetic element 15A which is a mover-side counter moment generating element paired therewith. Note that, in the following description, in a case where the counter-moment-generating stator-side magnetic element 25A of the stator-side platform 20Aa and that of the stator-side platform 20Ab are distinguished from each other, the counter-moment-generating stator-side magnetic element 25A of the stator-side platform 20Aa is referred to as a counter-moment-generating stator-side magnetic element 25Aa, and the counter-moment-generating stator-side magnetic element 25A of the stator-side platform 20Ab is referred to as a counter-moment-generating stator-side magnetic element 25Ab.

The additional rail 26A is a rail provided at the upper surface of the main body portion 211A of the platform structure 21A and having a flat running surface. The additional rail 26A engages with the additional rollers 16A.

In the second embodiment, the stator-side platforms 20Aa and 20Ab on both sides of the conveyance carrier 10A in the X direction diverge at the divergence portion, and the stator-side platform 20A is disposed only on one side of the conveyance carrier 10A in the X direction. In addition, the stator-side platforms 20Aa and 20Ab are disposed on both sides of the conveyance carrier 10A in the X direction at a portion other than the divergence portion.

In the second embodiment, similarly to Prior Art 1, the driving mover-side magnetic elements 14Aa and 14Ab, the upper V rollers 12A, and the lower flat rollers 13A are provided on both sides of the conveyance carrier 10A in the X direction. On portions of tracks other than the divergence portion, as illustrated in FIG. 6, the stator-side platforms 20Aa and 20Ab are present on both sides of the conveyance carrier 10A in the X direction, and a linear motor is constituted with the driving mover-side magnetic elements 14Aa and 14Ab and the driving stator-side magnetic elements 24Aa and 24Ab. In that case, the driving mover-side magnetic elements 14Aa and 14Ab and/or the driving stator-side magnetic elements 24Aa and 24Ab are electromagnets. In addition, in the second embodiment, the additional rollers 16A each including the rotation axis 161A extending in the X direction are added to the conveyance carrier 10A, and the additional rails 26A are added to the upper surfaces of the main body portions 211A of the stator-side platforms 20A. Then, the upper V rollers 12A of the conveyance carrier 10A and the upper V-groove rails 22A of the stator-side platforms 20A engage with each other, the lower flat rollers 13A of the conveyance carrier 10A and the lower flat rails 23A of the stator-side platforms 20A engage with each other, and the additional rollers 16A of the conveyance carrier 10A and the additional rails 26A of the stator-side platforms 20A engage with each other. Consequently, the conveyance carrier 10A can move along the stator-side platforms 20A.

On portions of tracks other than the divergence portion, as illustrated in FIG. 6, the conveyance carrier 10A is in the "doubly-supported state" in which the upper V rollers 12A, the lower flat rollers 13A, and the additional rollers 16A on both sides of the conveyance carrier 10A in the X direction engage with the upper V-groove rails 22A, the lower flat rails 23A, and the additional rails 26A of the stator-side platforms 20Aa and 20Ab on both right and left sides, respectively, and there is no problem of the overturning of the conveyance carrier 10A. However, in a case where the stator-side platform 20A is disposed on one side of the conveyance carrier 10A in the X direction, for example, at the divergence portion, the stator-side platforms 20Aa and 20Ab on both sides of the conveyance carrier 10A in the X direction diverge. As a result, as illustrated in FIG. 7, by a magnetic attraction force between the driving stator-side magnetic element 24Aa of the stator-side platform 20A on one side among the stator-side platforms 20A on both sides in the X direction, and the driving mover-side magnetic element 14Aa of the conveyance carrier 10A, the conveyance carrier 10A is driven while being adsorbed only to the stator-side platform 20Aa on one side.

At that time, on an opposite side where the stator-side platform 20Ab is not present, the upper V rollers 12A, the lower flat rollers 13A, and the additional rollers 16A are not engaged with the upper V-groove rail 22A, the lower flat rail 23A, and the additional rail 26A, respectively. That is, the conveyance carrier 10A is in the "cantilevered state" in which the conveyance carrier 10A is supported by the engagement between the upper V rollers 12A and the upper V-groove rail 22A, the engagement between the lower flat rollers 13A and the lower flat rail 23A, and the engagement between the additional rollers 16A and the additional rail 26A on an adsorption side. At the divergence portion where the conveyance carrier 10A is in the "cantilever state", it is necessary to consider the overturning of the conveyance carrier 10A similarly to the first embodiment.

In the second embodiment, the conveyance carrier 10A includes, at the upper portions of the conveyance carrier main structure 11A, the counter-moment-generating mover-side magnetic elements 15Aa and 15Ab which are attraction force generating elements, and the stator-side platforms 20A include, at the side wall portions 212A at upper portions of the platform structures 21A, the counter-moment-generating stator-side magnetic elements 25Aa and 25Ab which are attraction force generating elements. A magnetic attraction force in the horizontal direction is generated between the counter-moment-generating mover-side magnetic element 15Aa and the counter-moment-generating stator-side magnetic element 25Aa, or between the counter-moment-generating mover-side magnetic element 15Ab and the counter-moment-generating stator-side magnetic element 25Ab. Consequently, the upper portion of the conveyance carrier 10A is attracted to the stator-side platform 20A even when the conveyance carrier 10A is in the "cantilever state", and it is possible to reduce the overturning of the conveyance carrier 10A due to the overturning moment derived from the load thereof in the upper-lower direction. Note that the counter-moment-generating mover-side magnetic elements 15Aa and 15Ab and/or the counter-moment-generating stator-side magnetic elements 25Aa and 25Ab may be electromagnets, and the control device may control energization of the electromagnets in synchronization with the control of energization of the linear motor.

Figure 8:
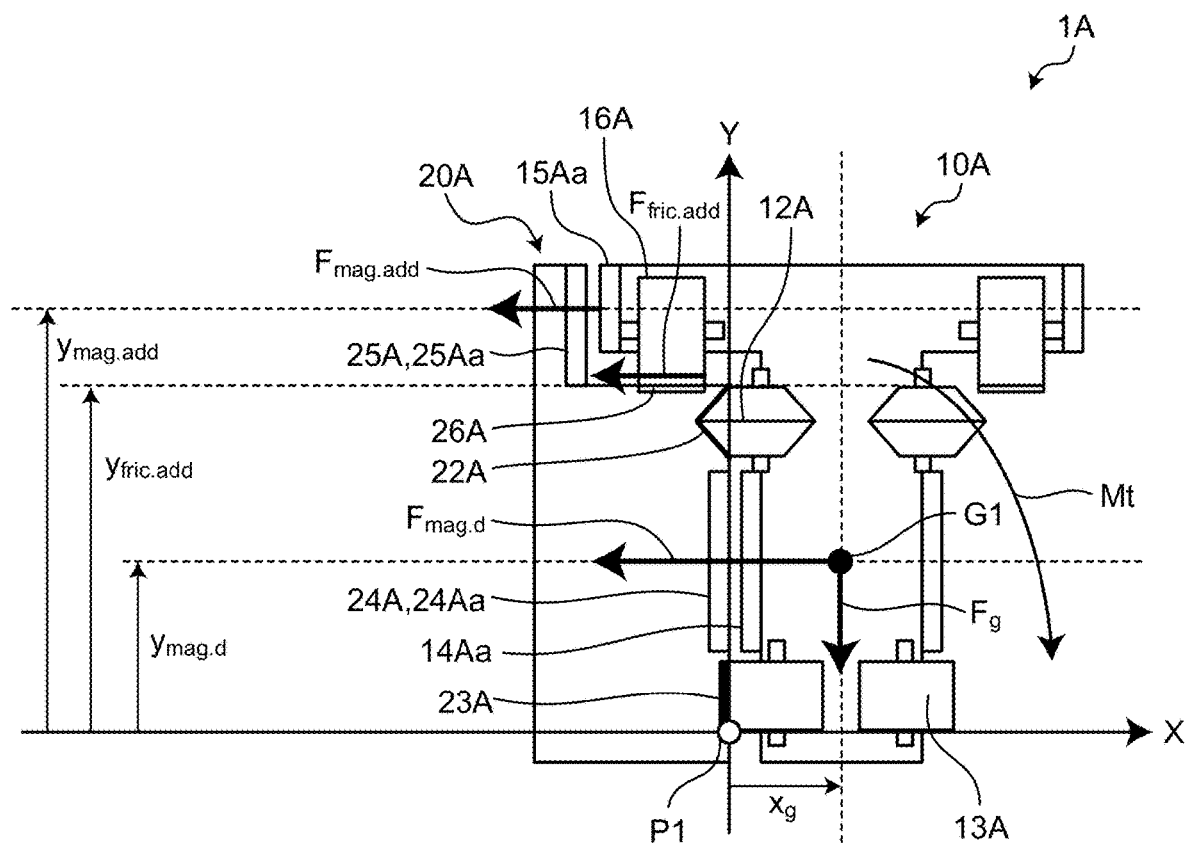
FIG. 8 is a diagram for explaining an effect of the linear conveyance device according to the second embodiment.

FIG. 8 is a diagram for explaining an effect of the linear conveyance device according to the second embodiment. Similarly to the first embodiment, consider the balance of a rotational moment around a point P1 which is a lowermost portion of an engagement surface between the lower flat roller 13A and the lower flat rail 23A. An overturning moment Mt acts around the point P1, the overturning moment Mt being a moment formed by the product of a gravity $F_g$ of the conveyance carrier 10A in the Y direction which is the upper-lower direction and a horizontal distance $x_g$ from the point P1 to a centroid position G1 of the entire conveyance carrier 10A. In this example, the horizontal direction corresponds to the X direction. The overturning moment Mt has an action of overturning the conveyance carrier 10A around the point P1. A counter moment with respect to the overturning moment Mt is a moment formed by the product of a magnetic attraction force $F_{mag.d}$ in the horizontal direction by the driving mover-side magnetic element 14Aa and the driving stator-side magnetic element 24Aa and a distance $y_{mag.d}$ in the Y direction which is the upper-lower direction from the point P1 to the center of the magnetic attraction force $F_{mag.d}$ of the conveyance carrier 10A.

In addition, in the second embodiment, a moment formed by the product of a lateral frictional force $F_{fric.add}$ between the additional roller 16A and the additional rail 26A and a distance $y_{fric.add}$ in the Y direction which is the upper-lower direction from the point P1 to the additional rail 26A is also a counter moment. The configuration and the effect described so far are similar to those of Prior Art 1, and the conveyance carrier 10A overturns when the overturning moment Mt exceeds the counter moment similarly to the first embodiment. Therefore, also in the technique described in Prior Art 1, it is necessary to limit the weight of the object to be conveyed or the horizontal distance $x_g$ between the centroid position of the conveyance carrier 10A and the point P1.

On the other hand, in the second embodiment, a magnetic attraction force $F_{mag.add}$ in the horizontal direction is generated between the counter-moment-generating mover-side magnetic element 15Aa and the counter-moment-generating stator-side magnetic element 25Aa disposed on upper portions of the conveyance carrier 10A and the stator-side platform 20A, respectively. Consequently, it is possible to increase the counter moment with respect to the overturning moment Mt.

A condition for preventing the above-described overturning of the conveyance carrier 10A is formulated. The condition for preventing the overturning of the conveyance carrier 10A is that the following formula (2) is established in which in addition to the variable definition in the first embodiment, the lateral frictional force between the additional roller 16A and the additional rail 26A is denoted by $F_{fric.add}$, and the distance in the Y direction from the point P1 to the additional rail 26A is denoted by $y_{fric.add}$.

$$x_g F_g < y_{mag.d} F_{mag.d} + y_{fric.add} F_{fric.add} + y_{mag.add} F_{mag.add} \quad (2)$$

Similarly to the first embodiment, in order to alleviate the limit on the weight of the object to be conveyed or the horizontal distance $x_g$ between the centroid position of the conveyance carrier 10A and the point P1, it is only required to increase the magnetic attraction force $F_{fric.add}$ of the counter moment generating elements, or to increase the distance $y_{fric.add}$ from the point P1 to the center of the magnetic attraction force $F_{fric.add}$ in the counter moment generating elements.

In one example, the attraction force between the counter-moment-generating mover-side magnetic element 15A and the counter-moment-generating stator-side magnetic element 25A and the distance in the Y direction between the center of the attraction force and the point P1 are determined on the basis of the magnetic attraction force between the driving mover-side magnetic element 14A and the driving stator-side magnetic element 24A and the distance in the Y direction between the center of the magnetic attraction force and the point P1.

Note that, although there is an effect of the lateral frictional force $F_{fric.add}$ between the additional roller 16A and the additional rail 26A as the counter moment, in general, the lateral frictional force $F_{fric.add}$ is very small compared to other components, and the effect as the counter moment is minute.

As illustrated in FIG. 6, the stator-side platforms 20A are disposed on both sides of the conveyance carrier 10A in the X direction at a portion other than the divergence portion, and the conveyance carrier 10A is in the "doubly-supported state". However, since only one of the stator-side platforms 20A on both sides in the X direction is present at the divergence portion, the conveyance carrier 10A is locally in the "cantilever state". Since there is a possibility that the conveyance carrier 10A overturns at the divergence portion, the weight or the centroid position of the entire conveyance carrier 10A is limited in Prior Art 1. However, in the second embodiment, a horizontal magnetic attraction force is generated by the counter moment generating elements, and thereby the overturning of the conveyance carrier 10A is prevented and the limit of the weight or the centroid position of the entire conveyance carrier 10A is alleviated.

Figure 9:
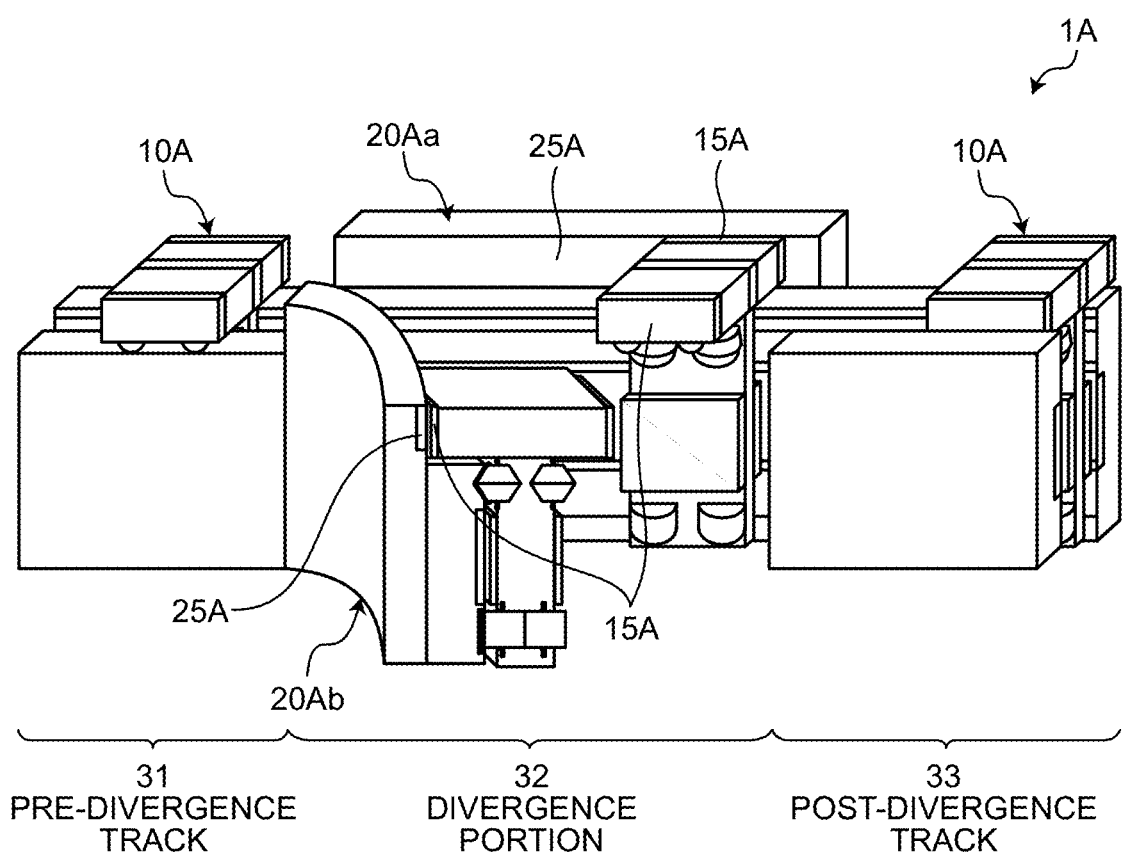
FIG. 9 is an overhead view illustrating another example of the vicinity of the divergence portion of the linear conveyance device according to the second embodiment.

FIG. 9 is an overhead view illustrating another example of the vicinity of the divergence portion of the linear conveyance device according to the second embodiment. As described above, the conveyance carrier 10A is in the "cantilever state" only at the divergence portion 32. Therefore, as illustrated in FIG. 9, on the stator-side platforms 20A, the counter-moment-generating stator-side magnetic elements 25A may be disposed only at the divergence portion 32 where the conveyance carrier 10A is in the "cantilever state", and may be omitted, that is, may not be disposed on other portions of tracks, that is, on the pre-divergence track 31 and the post-divergence track 33.

Also in the second embodiment, an effect similar to that in the first embodiment can be obtained.

Third Embodiment

In Prior Art 2 described below, a transport system is disclosed in which stator-side platforms are always disposed on both sides of a conveyance carrier on all tracks except a divergence portion, rollers whose rolling surfaces have equal inclination angles with respect to the vertical direction are provided at upper and lower portions on both left and right sides of the conveyance carrier, and these rollers are engaged with rails of the stator-side platforms to support the conveyance carrier in the upper-lower direction.

(Prior Art 2) WO 2015/042409 A

In the case of the technique described in Prior Art 2, when the conveyance carrier is in the "cantilevered state" at the divergence portion, a problem is the balance of the rotation around the center of a tangent circle which is a circle in contact with each engagement surface of the upper and lower rollers. A moment which acts on around the center of the tangent circle is an overturning moment formed by the product of a load of the conveyance carrier in the upper-lower direction and a horizontal distance from the center of the tangent circle to a centroid position of the entire conveyance carrier. This overturning moment has an effect of overturning the conveyance carrier around the center of the tangent circle. Since a distance in the upper-lower direction from the center of the tangent circle to the center of a magnetic attraction force of the conveyance carrier is zero or very small in design, a counter moment by the magnetic attraction force in the horizontal direction by magnetic elements of the conveyance carrier and the stator-side platform is very small. In addition, since counter moments by frictional forces between the rollers and the rails are also minute similarly to Prior Art 1, the conveyance carrier easily overturns around the center of the tangent circle. That is, the conveyance carrier slips on the engagement surfaces of the upper and lower rollers and rotationally falls off. As a result, similarly to Patent Literature 1 and Prior Art 1, it is necessary to limit the weight or the centroid position of the object to be conveyed, which is a problem. In a third embodiment, a description will be given for a linear conveyance device capable of further reducing overturning of a conveyance carrier around the center of a tangent circle than ever in a case where the conveyance carrier is in the "cantilever state", the conveyance carrier including rollers provided at upper and lower portions on both left and right sides of the conveyance carrier, rolling surfaces of the rollers having equal inclination angles with respect to the vertical direction.

Figure 10:
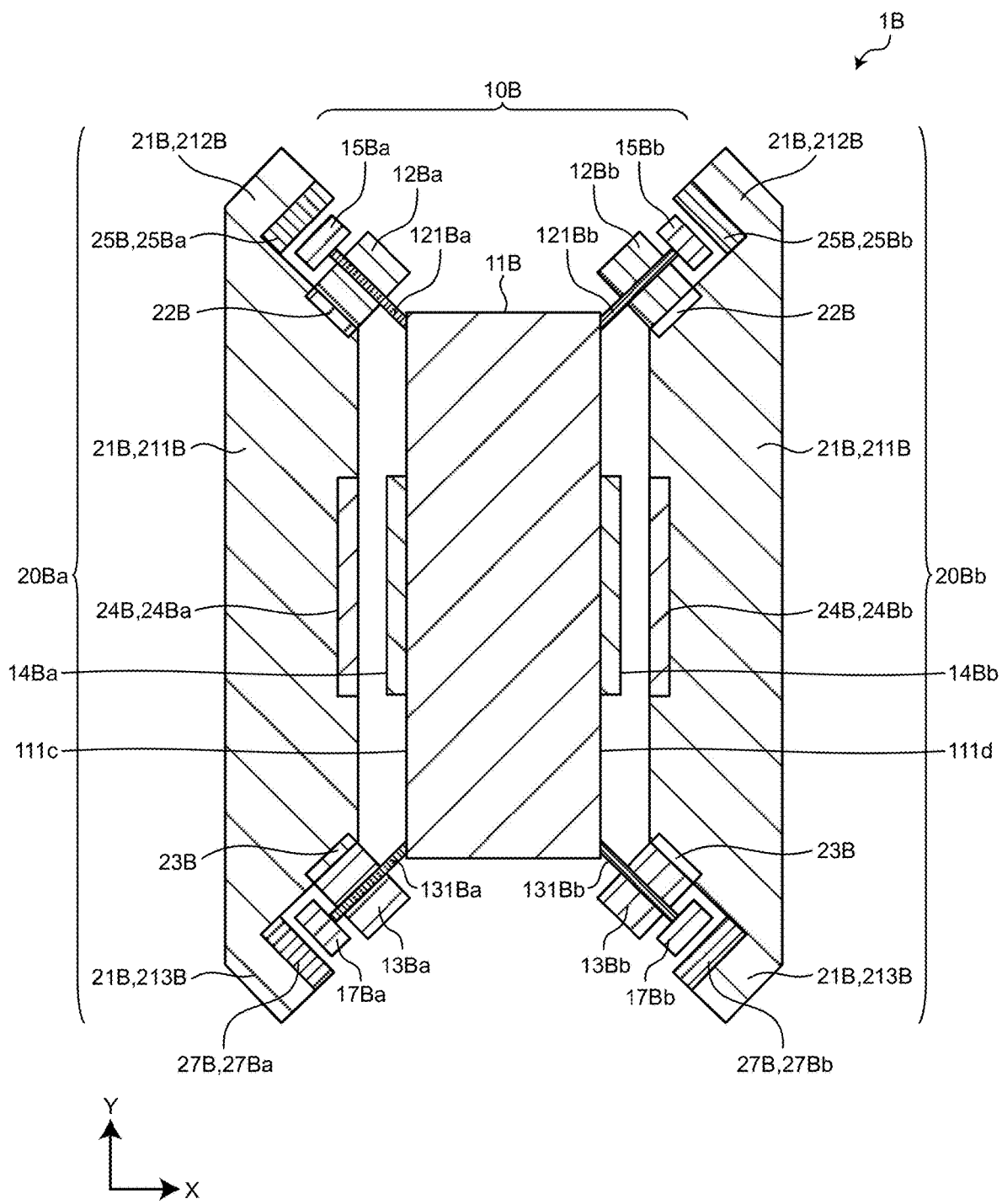
FIG. 10 is a cross-sectional view illustrating an example of a configuration of a linear conveyance device according to a third embodiment, taken at a position of a portion other than a divergence portion.
Figure 11:
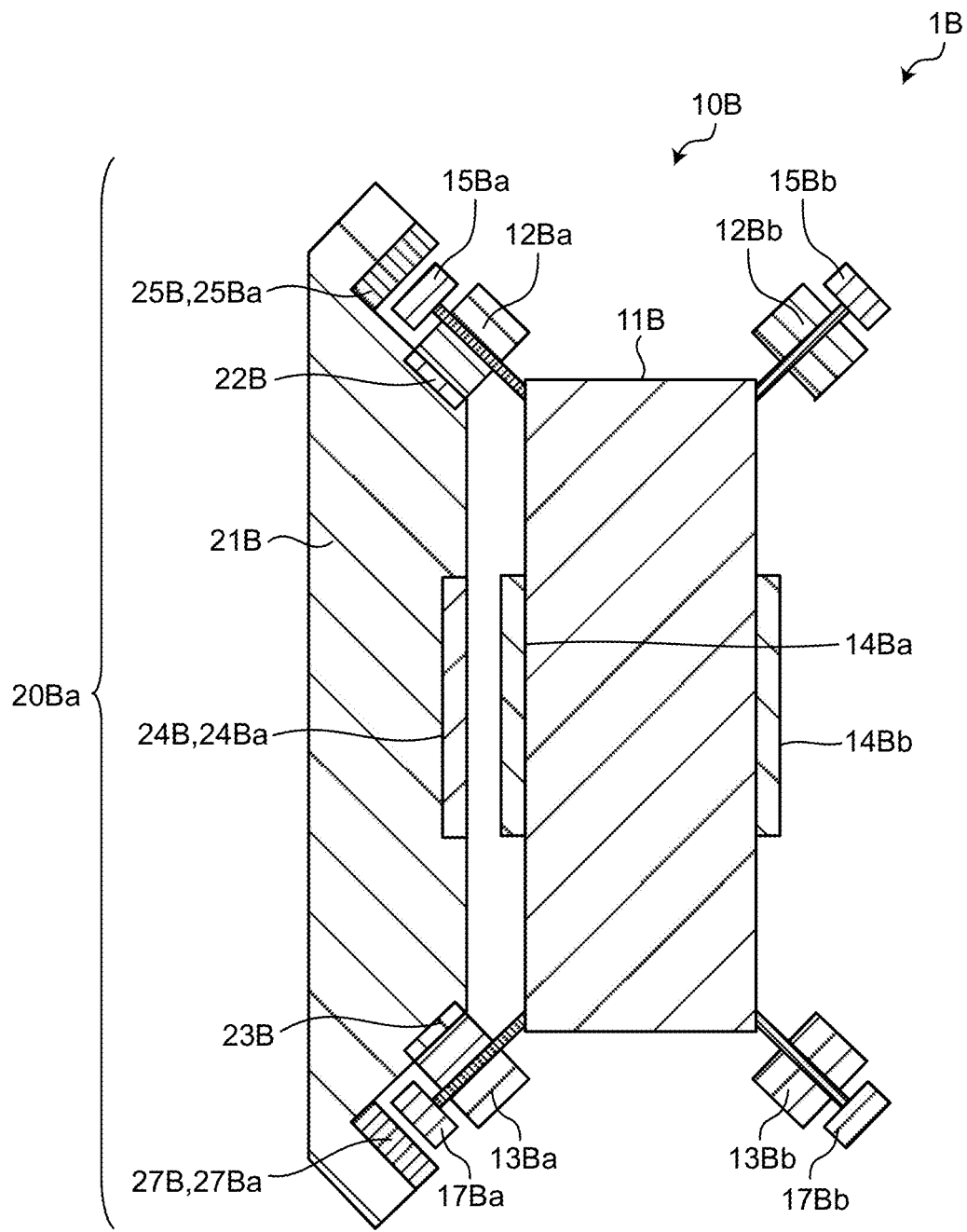
FIG. 11 is a cross-sectional view illustrating an example of the configuration of the linear conveyance device according to the third embodiment, taken at a position of the divergence portion.

FIG. 10 is a cross-sectional view illustrating an example of a configuration of a linear conveyance device according to the third embodiment, taken at a position of a portion other than a divergence portion. FIG. 11 is a cross-sectional view illustrating an example of the configuration of the linear conveyance device according to the third embodiment, taken at a position of the divergence portion. FIGS. 10 and 11 each illustrate a cross section perpendicular to the Z direction. Similarly to the second embodiment, in a linear conveyance device 1B of the third embodiment, a conveyance carrier is in the "doubly-supported state" as illustrated in FIG. 10 at a portion other than the divergence portion, and is in the "cantilever state" as illustrated in FIG. 11 at the divergence portion. The linear conveyance device 1B includes a conveyance carrier 10B and stator-side platforms 20Ba and 20Bb.

The conveyance carrier 10B includes a conveyance carrier main structure 11B, upper flat rollers 12Ba and 12Bb, lower flat rollers 13Ba and 13Bb, driving mover-side magnetic elements 14Ba and 14Bb, counter-moment-generating mover-side upper magnetic elements 15Ba and 15Bb, and counter-moment-generating mover-side lower magnetic elements 17Ba and 17Bb.

The conveyance carrier main structure 11B is a member that supports an object to be conveyed. In the examples in FIGS. 10 and 11, in the conveyance carrier main structure 11B, side surfaces 111c and 111d which are surfaces parallel to the Z direction and the Y direction are constituted with plate-like members larger than front and rear surfaces which are surfaces perpendicular to the Z direction and upper and lower surfaces which are surfaces perpendicular to the Y direction.

The upper flat roller 12Ba is provided at an upper portion of the conveyance carrier main structure 11B in the X direction, specifically, at an upper portion of the conveyance carrier main structure 11B on a side of the stator-side platform 20Ba. The upper flat roller 12Ba is supported by a rotation axis 121Ba inclined at a predetermined inclination angle from the Y direction, and rotates around the rotation axis 121Ba. The upper flat roller 12Bb is provided at an upper portion of the conveyance carrier main structure 11B in the X direction, specifically, at an upper portion of the conveyance carrier main structure 11B on a side of the stator-side platform 20Bb. The upper flat roller 12Bb is supported by a rotation axis 121Bb inclined at a predetermined inclination angle from the Y direction, and rotates around the rotation axis 121Bb. The rotation axes 121Ba and 121Bb extend in a direction of a predetermined inclination angle larger than 0 degrees and 90 degrees or less from the Y direction toward the X direction. The rotation axis 121Ba and the rotation axis 121Bb are provided so as to have respective predetermined angles in opposite directions from the vertical direction in an XY plane. That is, the rolling surfaces of the upper flat rollers 12Ba and 12Bb are inclined with respect to the Y direction. In each of cross sections of the upper flat rollers 12Ba and 12Bb passing through the rotation axes 121Ba and 121Bb, the shape of a rolling surface present in a radially peripheral edge portion is flat. The upper flat rollers 12Ba and 12Bb correspond to first rollers provided on the conveyance carrier main structure 11B. The rotation axis 121Ba and the rotation axis 121Bb correspond to upper rotation axes.

The lower flat roller 13Ba is provided at a lower portion of the conveyance carrier main structure 11B in the X direction, specifically, at a lower portion of the conveyance carrier main structure 11B on the side of the stator-side platform 20Ba. The lower flat roller 13Ba is supported by a rotation axis 131Ba inclined at a predetermined inclination angle from the Y direction, and rotates around the rotation axis 131Ba. The lower flat roller 13Bb is provided at a lower portion of the conveyance carrier main structure 11B in the X direction, specifically, at a lower portion of the conveyance carrier main structure 11B on the side of the stator-side platform 20Bb. The lower flat roller 13Bb is supported by a rotation axis 131Bb inclined at a predetermined inclination angle from the Y direction, and rotates around the rotation axis 131Bb. The rotation axes 131Ba and 131Bb extend in a direction of a predetermined inclination angle larger than 0 degrees and 90 degrees or less from the Y direction toward the X direction. The rotation axis 131Ba and the rotation axis 131Bb are provided so as to have respective predetermined angles in opposite directions from a negative side in the Y direction in the XY plane. That is, the rolling surfaces of the lower flat rollers 13Ba and 13Bb are inclined with respect to the Y direction. In each of cross sections of the lower flat rollers 13Ba and 13Bb passing through the rotation axes 131Ba and 131Bb, the shape of a rolling surface present in a radially peripheral edge portion is flat. The lower flat rollers 13Ba and 13Bb correspond to second rollers provided on the conveyance carrier main structure 11B at a height different from a height where the first rollers are provided. The rotation axis 131Ba and the rotation axis 131Bb correspond to lower rotation axes.

The driving mover-side magnetic element 14Ba is provided on the side surface 111c of the conveyance carrier main structure 11B in the X direction, and drives the conveyance carrier main structure 11B with respect to the stator-side platform 20Ba. In the examples in FIGS. 10 and 11, the driving mover-side magnetic element 14Ba is provided on the side surface 111c of the conveyance carrier main structure 11B in the X direction between the upper flat roller 12Ba and the lower flat roller 13Ba. The driving mover-side magnetic element 14Bb is provided on the side surface 111d of the conveyance carrier main structure 11B in the X direction, and drives the conveyance carrier main structure 11B with respect to the stator-side platform 20Bb. In the examples in FIGS. 11 and 10, the driving mover-side magnetic element 14Bb is provided on the side surface 111d of the conveyance carrier main structure 11B in the X direction between the upper flat roller 12Bb and the lower flat roller 13Bb. In one example, the driving mover-side magnetic elements 14Ba and 14Bb are permanent magnets or electromagnets. The driving mover-side magnetic elements 14Ba and 14Bb correspond to mover-side magnetic elements. The driving mover-side magnetic elements 14Ba and 14Bb are each referred to as a driving mover-side magnetic element 14B when not being individually distinguished.

The counter-moment-generating mover-side upper magnetic element 15Ba is disposed at a tip end portion of the rotation axis 121Ba of the upper flat roller 12Ba, and generates an attraction force between the counter-momentgenerating mover-side upper magnetic element 15Ba and the stator-side platform 20Ba. The counter-moment-generating mover-side upper magnetic element 15Bb is disposed at a tip end portion of the rotation axis 121Bb of the upper flat roller 12Bb, and generates an attraction force between the counter-moment-generating mover-side upper magnetic element 15Bb and the stator-side platform 20Bb. In one example, the counter-moment-generating mover-side upper magnetic elements 15Ba and 15Bb are electromagnets or permanent magnets. When the conveyance carrier 10B is in the "cantilever state", the counter-moment-generating mover-side upper magnetic elements 15Ba and 15Bb generate, with respect to the conveyance carrier 10B, a counter moment which is a moment against an overturning moment derived from a load of the conveyance carrier 10B in the upper-lower direction. The counter-moment-generating mover-side upper magnetic elements 15Ba and 15Bb correspond to mover-side attraction force generating elements.

The counter-moment-generating mover-side lower magnetic element 17Ba is disposed at a tip end portion of the rotation axis 131Ba of the lower flat roller 13Ba, and generates a repulsive force between the counter-moment-generating mover-side lower magnetic element 17Ba and the stator-side platform 20Ba. The counter-moment-generating mover-side lower magnetic element 17Bb is disposed at a tip end portion of the rotation axis 131Bb of the lower flat roller 13Bb, and generates a repulsive force between the counter-moment-generating mover-side lower magnetic element 17Bb and the stator-side platform 20Bb. In one example, the counter-moment-generating mover-side lower magnetic elements 17Ba and 17Bb are electromagnets or permanent magnets. When the conveyance carrier 10B is in the "cantilever state", the counter-moment-generating mover-side lower magnetic elements 17Ba and 17Bb generate, with respect to the conveyance carrier 10B, a counter moment which is a moment against an overturning moment derived from the load of the conveyance carrier 10B in the upper-lower direction. The counter-moment-generating mover-side lower magnetic elements 17Ba and 17Bb correspond to mover-side repulsive force generating elements.

The counter-moment-generating mover-side upper magnetic elements 15Ba and 15Bb and the counter-moment-generating mover-side lower magnetic elements 17Ba and 17Bb constitute mover-side counter moment generating elements. The mover-side counter moment generating elements are disposed side surfaces on both sides of the conveyance carrier main structure 11B in the X direction, and generate counter moments against overturning of the conveyance carrier 10B between the mover-side counter moment generating elements and the stator-side platforms 20B.

Also in the third embodiment, similarly to the second embodiment, the stator-side platforms 20Ba and 20Bb are provided on both sides of the conveyance carrier 10B in the X direction at a portion other than the divergence portion. That is, on the stator-side platforms 20Ba and 20Bb, the conveyance carrier 10B is in the "doubly-supported state" at a portion other than the divergence portion. Therefore, there are the stator-side platform 20Ba facing the side surface 111c of the conveyance carrier main structure 11B and the stator-side platform 20Bb facing the side surface 111d of the conveyance carrier main structure 11B. Note that, in the following description, the stator-side platform 20Ba and the stator-side platform 20Bb are each referred to as a stator-side platform 20B when not being individually distinguished.

Each stator-side platform 20B includes a platform structure 21B, an upper flat rail 22B, a lower flat rail 23B, a driving stator-side magnetic element 24B, a counter-moment-generating stator-side upper magnetic element 25B, and a counter-moment-generating stator-side lower magnetic element 27B.

The platform structure 21B is a support member that supports the conveyance carrier 10B while moving the conveyance carrier 10B. The platform structure 21B is provided along a movement path of the conveyance carrier 10B. In the third embodiment, the platform structure 21B includes a main body portion 211B having a trapezoidal cross section perpendicular to the Z direction, an upper side wall portion 212B provided on an upper portion of the main body portion 211B on a side opposite to a side on which the conveyance carrier 10B is disposed, and a lower side wall portion 213B provided at a lower portion of the main body portion 211B on the side opposite to the side on which the conveyance carrier 10B is disposed. The upper flat rollers 12Ba and 12Bb and the counter-moment-generating mover-side upper magnetic elements 15Ba and 15Bb can pass through spaces above the main body portions 211B surrounded by upper surfaces of the main body portions 211B intersecting the Y direction and the upper side wall portions 212B. The lower flat rollers 13Ba and 13Bb and the counter-moment-generating mover-side lower magnetic elements 17Ba and 17Bb can pass through spaces below the main body portions 211B surrounded by lower surfaces of the main body portions 211B intersecting the Y direction and the lower side wall portions 213B.

The upper flat rails 22B are each a rail provided at the upper surface of the main body portion 211B of the platform structure 21B intersecting the Y direction and having a flat running surface. The upper flat rails 22B are provided at positions corresponding to the upper flat rollers 12Ba and 12Bb of the conveyance carrier 10B and engage with the upper flat rollers 12Ba and 12Bb. The upper flat rails 22B are provided on the platform structures 21B and correspond to the first rails that engage with the upper flat rollers 12Ba and 12Bb which are the first rollers.

The lower flat rails 23B are each a rail provided at the lower surface of the main body portion 211B of the platform structure 21B intersecting the Y direction and having a flat running surface. The lower flat rails 23B are provided at positions corresponding to the lower flat rollers 13Ba and 13Bb of the conveyance carrier 10B and engage with the lower flat rollers 13Ba and 13Bb. The lower flat rails 23B are provided on the platform structures 21B and correspond to the second rails that engage with the lower flat rollers 13Ba and 13Bb which are the second rollers.

The driving stator-side magnetic element 24B is paired with the driving mover-side magnetic element 14B to generate a magnetic attraction force in the horizontal direction. In the examples in FIGS. 10 and 11, each driving stator-side magnetic element 24B is provided on a side surface of the main body portion 211B of the platform structure 21B between the upper flat rail 22B and the lower flat rail 23B, the side surface facing the conveyance carrier 10B. In one example, the driving stator-side magnetic element 24B is a permanent magnet or an electromagnet. Note that, in the following description, in a case where the driving stator-side magnetic element 24B of the stator-side platform 20Ba and that of the stator-side platform 20Bb are distinguished from each other, the driving stator-side magnetic element 24B of the stator-side platform 20Ba is referred to as a driving stator-side magnetic element 24Ba, and the driving stator-side magnetic element 24B of the stator-side platform 20Bb is referred to as a driving stator-side magnetic element 24Bb.

The driving stator-side magnetic elements 24B correspond to stator-side magnetic elements.

The counter-moment-generating stator-side upper magnetic elements 25B are paired with the counter-moment-generating mover-side upper magnetic elements 15Ba and 15Bb to generate attraction forces in directions of the rotation axes 121Ba and 121Bb. In the examples in FIGS. 10 and 11, each counter-moment-generating stator-side upper magnetic element 25B is provided on a side surface of the upper side wall portion 212B of the platform structure 21B, the side surface facing the conveyance carrier 10B. In one example, the counter-moment-generating stator-side upper magnetic element 25B is an electromagnet or a permanent magnet. The counter-moment-generating stator-side upper magnetic element 25B corresponds to a stator-side attraction force generating element. Note that, in the following description, in a case where the counter-moment-generating stator-side upper magnetic element 25B of the stator-side platform 20Ba and that of the stator-side platform 20Bb are distinguished from each other, the counter-moment-generating stator-side upper magnetic element 25B of the stator-side platform 20Ba is referred to as a counter-moment-generating stator-side upper magnetic element 25Ba, and the counter-moment-generating stator-side upper magnetic element 25B of the stator-side platform 20Bb is referred to as a counter-moment-generating stator-side upper magnetic element 25Bb.

The counter-moment-generating stator-side lower magnetic elements 27B are paired with the counter-moment-generating mover-side lower magnetic elements 17Ba and 17Bb to generate repulsive forces in directions of the rotation axes 131Ba and 131Bb. In the examples in FIGS. 10 and 11, each counter-moment-generating stator-side lower magnetic element 27B is provided on a side surface of the lower side wall portion 213B of the platform structure 21B, the side surface facing the conveyance carrier 10B. In one example, the counter-moment-generating stator-side lower magnetic element 27B is an electromagnet or a permanent magnet. The counter-moment-generating stator-side lower magnetic element 27B corresponds to a stator-side repulsive force generating element. Note that, in the following description, in a case where the counter-moment-generating stator-side lower magnetic element 27B of the stator-side platform 20Ba and that of the stator-side platform 20Bb are distinguished from each other, the counter-moment-generating stator-side lower magnetic element 27B of the stator-side platform 20Ba is referred to as a counter-moment-generating stator-side lower magnetic element 27Ba, and the counter-moment-generating stator-side lower magnetic element 27B of the stator-side platform 20Bb is referred to as a counter-moment-generating stator-side lower magnetic element 27Bb.

The counter-moment-generating stator-side upper magnetic elements 25Ba and 25Bb and the counter-moment-generating stator-side lower magnetic elements 27Ba and 27Bb constitute stator-side counter moment generating elements. The stator-side counter moment generating elements are disposed on the platform structures 21B and generate counter moments between the stator-side counter moment generating elements and the mover-side counter moment generating elements paired therewith.

Here, a difference in the linear conveyance device 1B of the third embodiment from the second embodiment will be described. In the second embodiment, the load of the conveyance carrier 10A in the upper-lower direction is supported by the upper V rollers 12A and the additional rollers 16A provided on the conveyance carrier 10A, and the upper V-groove rail 22A and the additional rail 26A of the stator-side platform 20A corresponding thereto. On the other hand, in the third embodiment, the load of the conveyance carrier 10B in the upper-lower direction is supported by the upper flat rollers 12Ba and 12Bb and the lower flat rollers 13Ba and 13Bb whose rolling surfaces have equal inclination angles with respect to the Y direction which is the upper-lower direction.

Regarding the counter moment generating magnetic elements, in the second embodiment, the counter-moment-generating mover-side magnetic elements 15Aa and 15Ab provided at the upper portions of the conveyance carrier 10A and the counter-moment-generating stator-side upper magnetic elements 25Aa and 25Ab provided at the upper portions of the stator-side platforms 20A generate the magnetic attraction forces in the horizontal direction. On the other hand, in the third embodiment, the counter-moment-generating mover-side upper magnetic elements 15Ba and 15Bb of the conveyance carrier 10B and the counter-moment-generating stator-side upper magnetic elements 25Ba and 25Bb of the stator-side platforms 20B cause the upper flat rollers 12Ba and 12Bb to generate the magnetic attraction forces in the directions of the rotation axes 121Ba and 121Bb. In addition, the counter-moment-generating mover-side lower magnetic elements 17Ba and 17Bb of the conveyance carrier 10B and the counter-moment-generating stator-side lower magnetic elements 27Ba and 27Bb of the stator-side platforms 20B cause the lower flat rollers 13Ba and 13Bb to generate the magnetic repulsive forces in the directions of the rotation axes 131Ba and 131Bb.

On portions of tracks other than the divergence portion, as illustrated in FIG. 10, the conveyance carrier 10B is in the "doubly-supported state" in which the upper flat rollers 12Ba and 12Bb and the lower flat rollers 13Ba and 13Bb disposed on both sides of the conveyance carrier 10B in the X direction, the rolling surfaces of which having predetermined inclination angles with respect to the Y direction which is the upper-lower direction, engage with the upper flat rails 22B and the lower flat rails 23B on the stator-side platforms 20Ba and 20Bb on both sides in the X direction, and there is no problem of the overturning of the conveyance carrier 10B. However, at the divergence portion illustrated in FIG. 11 or the like, the stator-side platforms 20Ba and 20Bb on both sides of the conveyance carrier 10B in the X direction diverge, and the stator-side platform 20B is disposed on one side of the conveyance carrier 10B in the X direction. In the example in FIG. 11, the conveyance carrier 10B moves along the stator-side platform 20Ba, and as a result, the stator-side platform 20Ba is disposed on one side of the conveyance carrier 10B in the X direction. In that case, by a magnetic attraction force between the driving stator-side magnetic element 24Ba of the stator-side platform 20Ba on one side, and the driving mover-side magnetic element 14Ba of the conveyance carrier 10B that faces the driving stator-side magnetic element 24Ba, the conveyance carrier 10B is driven while being adsorbed only to the stator-side platform 20Ba. Here, the driving mover-side magnetic element 14Ba and the driving stator-side magnetic element 24Ba constitute a linear motor. In that case, the driving mover-side magnetic element 14Ba and/or the driving stator-side magnetic element 24Ba is an electromagnet. At that time, the upper flat roller 12Bb and the lower flat roller 13Bb on the side opposite to the side of the conveyance carrier 10B adsorbed to the stator-side platform 20Ba do not engage with the upper flat rail 22B and the lower flat rail 23B. That is, the conveyance carrier 10B is in the "cantilever state" in which the conveyance carrier 10B is supported by the engagement between the upper flat roller 12Ba and the upper flat rail 22B and the engagement between the lower flat roller 13Ba and the lower flat rail 23B on the adsorption side. At the divergence portion where the conveyance carrier 10B is in the "cantilever state", it is necessary to consider the overturning of the conveyance carrier 10B similarly to the first and the second embodiments.

In the third embodiment, the conveyance carrier 10B includes the counter-moment-generating mover-side upper magnetic elements 15Ba and 15Bb and the counter-moment-generating mover-side lower magnetic elements 17Ba and 17Bb. The stator-side platforms 20Ba and 20Bb include the counter-moment-generating stator-side upper magnetic elements 25Ba and 25Bb and the counter-moment-generating stator-side lower magnetic elements 27Ba and 27Bb. Between the counter-moment-generating mover-side upper magnetic element 15Ba and the counter-moment-generating stator-side upper magnetic element 25Ba and between the counter-moment-generating mover-side upper magnetic element 15Bb and the counter-moment-generating stator-side upper magnetic element 25Bb, attraction forces, in this case, magnetic attraction forces are generated in the directions of the rotation axes 121Ba and 121Bb of the upper flat rollers 12Ba and 12Bb, respectively. In addition, between the counter-moment-generating mover-side lower magnetic element 17Ba and the counter-moment-generating stator-side lower magnetic element 27Ba and between the counter-moment-generating mover-side lower magnetic element 17Bb and the counter-moment-generating stator-side lower magnetic element 27Bb, repulsive forces, in this case, magnetic repulsive forces are generated in the directions of the rotation axes 131Ba and 131Bb of the lower flat rollers 13Ba and 13Bb, respectively. Consequently, the upper portion of the conveyance carrier 10B is attracted to the stator-side platform 20B, and it is possible to reduce the overturning of the conveyance carrier 10B due to the overturning moment derived from the load thereof in the upper-lower direction when the conveyance carrier 10B is in the "cantilever state". Note that the counter-moment-generating mover-side upper magnetic elements 15Ba and 15Bb and/or the counter-moment-generating stator-side upper magnetic elements 25Ba and 25Bb may be electromagnets, and the control device may control energization of the electromagnets in synchronization with the control of energization of the linear motor. Similarly, the counter-moment-generating mover-side lower magnetic elements 17Ba and 17Bb and/or the counter-moment-generating stator-side lower magnetic elements 27Ba and 27Bb may be electromagnets, and the control device may control energization of the electromagnets in synchronization with the control of energization of the linear motor.

Here, the case where the repulsive force generating element is a magnetic element is taken as an example, but the repulsive force generating element may be an element other than the magnetic element and based on another method. There is a method using air pressure as a repulsive force generating element. In one example, there is a case where a repulsive force generating element for feeding air is provided at an upper portion of the conveyance carrier 10B in order to increase air pressure between the lower flat rollers 13Ba and 13Bb and the lower side wall portions 213B. Compared with such a method using air pressure, the method using a magnetic element eliminates the necessity for electric power or the like in generating the repulsive force.

Figure 12:
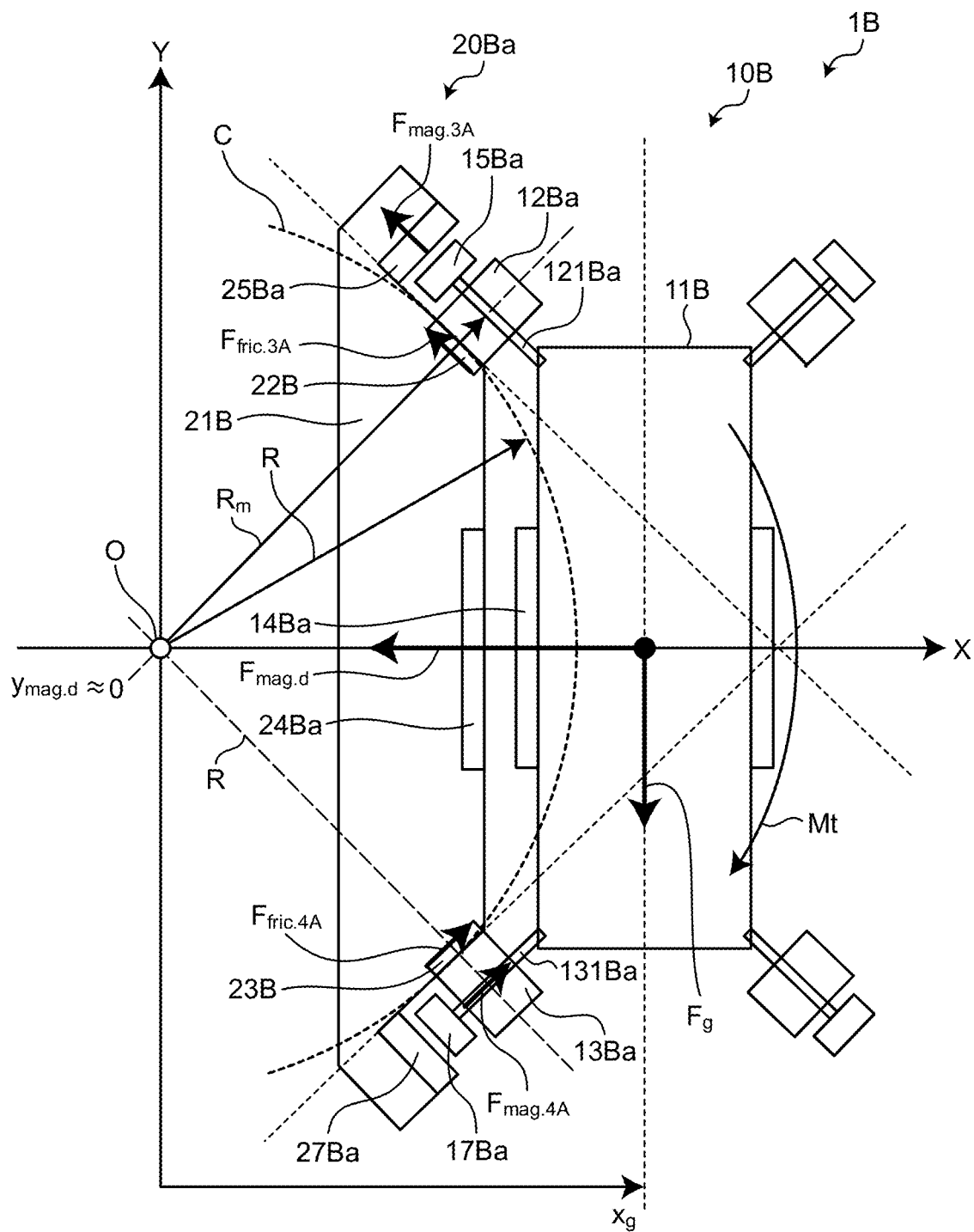
FIG. 12 is a diagram for explaining an effect of the linear conveyance device according to the third embodiment.

FIG. 12 is a diagram for explaining an effect of the linear conveyance device according to the third embodiment. Here, a case where the conveyance carrier 10B is adsorbed to the stator-side platform 20Ba will be taken as an example. In the balance of a rotational moment considered in the third embodiment, unlike the first and second embodiments, a problem is the balance of the rotation around a center O of a tangent circle C which is a circle in contact with an engagement surface between the upper flat roller 12Ba and the upper flat rail 22B and an engagement surface between the lower flat roller 13Ba and the lower flat rail 23B in the XY plane.

An overturning moment Mt acts around the center O of the tangent circle C, the overturning moment Mt being a moment formed by the product of a gravity $F_g$ of the conveyance carrier 10B in the Y direction which is the upper-lower direction and a horizontal distance $x_g$ from the center O of the tangent circle C to a centroid position of the entire conveyance carrier 10B. The overturning moment Mt has an effect of overturning the conveyance carrier 10B around the center O of the tangent circle C. Here, the horizontal direction corresponds to the X direction.

Similarly to the first and the second embodiments, a counter moment with respect to the overturning moment Mt is a moment formed by the product of a magnetic attraction force $F_{mag.d}$ in the horizontal direction by the driving mover-side magnetic element 14Ba and the driving stator-side magnetic element 24Ba and a distance $y_{mag.d}$ in the Y direction which is the upper-lower direction from the center O of the tangent circle C to the center of the magnetic attraction force $F_{mag.d}$ of the conveyance carrier 10B. However, when the conveyance carrier 10B adsorbed in the lateral direction by the magnetic attraction force $F_{mag.d}$ is supported by the engagement between the upper flat roller 12Ba and the upper flat rail 22B and the engagement between the lower flat roller 13Ba and the lower flat rail 23B, it is preferable in design that there be no difference between respective support loads. Therefore, the distance $y_{mag.d}$ in the Y direction from the center O of the tangent circle C to the center of the magnetic attraction force $F_{mag.d}$ of the conveyance carrier 10B is zero or a very small value. As a result, a counter moment derived from the magnetic attraction force $F_{mag.d}$ in the horizontal direction by the driving mover-side magnetic element 14Ba and the driving stator-side magnetic element 24Ba of the third embodiment is zero or very small.

Next, consider a counter moment by a load of the engagement surface between the upper flat roller 12Ba and the upper flat rail 22B and a load of the engagement surface between the lower flat roller 13Ba and the lower flat rail 23B. First, loads in an out-of-plane direction of contact surfaces between the upper and lower flat rollers 12Ba and 13Ba and the upper and lower flat rails 22B and 23B and the moment generated around the center O of the tangent circle C in contact with the engagement surfaces of the upper flat roller 12Ba and the lower flat roller 13Ba always become zero geometrically. A counter moment with respect to an overturning moment is a moment formed by the product of a frictional force $F_{fric.3A}$ in the contact surface between the upper flat roller 12Ba and the upper flat rail 22B and a frictional force $F_{fric.4A}$ in the contact surface between the lower flat roller 13Ba and the lower flat rail 23B, and a radius R of the tangent circle C. However, as described in the second embodiment, the frictional forces on the engagement surfaces between the rollers and the rails are very small as compared with the overturning moment.

As a result, the overturning moment of the conveyance carrier 10B of Prior Art 2 exceeds the counter moment, and the conveyance carrier 10B easily overturns around the center O of the tangent circle C. Specifically, the conveyance carrier 10B slips on the engagement surface between the upper flat roller 12Ba and the upper flat rail 22B and the engagement surface between the lower flat roller 13Ba and the lower flat rail 23B, and rotationally falls off. Therefore, it is necessary to significantly limit the weight of the object to be conveyed or the distance $x_g$ between the centroid position of the conveyance carrier 10B and the center O of the tangent circle C.

On the other hand, in the third embodiment, a magnetic attraction force is generated in a direction of the rotation axis 121Ba of the upper flat roller 12Ba between the counter-moment-generating mover-side upper magnetic element 15Ba and the counter-moment-generating stator-side upper magnetic element 25Ba disposed at upper portions of the conveyance carrier 10B and the stator-side platform 20Ba, respectively. In addition, a magnetic repulsive force is generated in a direction of the rotation axis 131Ba of the lower flat roller 13Ba between the counter-moment-generating mover-side lower magnetic element 17Ba and the counter-moment-generating stator-side lower magnetic element 27Ba provided at lower portions of the conveyance carrier 10B and the stator-side platform 20Ba, respectively. Consequently, it is possible to increase the counter moment with respect to the overturning moment.

A condition for preventing the above-described overturning of the conveyance carrier 10B is formulated. The condition for preventing the overturning of the conveyance carrier 10B is that the following formula (3) is established in which a radius of the tangent circle C of the engagement surface between the upper flat roller 12Ba and the upper flat rail 22B and the engagement surface between the lower flat roller 13Ba and the lower flat rail 23B is denoted by R, a frictional force in the contact surface between the upper flat roller 12Ba and the upper flat rail 22B is denoted by $F_{fric.3A}$, a frictional force in the contact surface between the lower flat roller 13Ba and the lower flat rail 23B is denoted by $F_{fric.4A}$, a radius from the center O of the tangent circle C to the center of a magnetic attraction force between the counter-moment-generating mover-side upper magnetic element 15Ba and the counter-moment-generating stator-side upper magnetic element 25Ba is denoted by $R_m$, a magnetic attraction force between the counter-moment-generating mover-side upper magnetic element 15Ba and the counter-moment-generating stator-side upper magnetic element 25Ba is denoted by $F_{mag.3A}$, and a magnetic repulsive force between the counter-moment-generating mover-side lower magnetic element 17Ba and the counter-moment-generating stator-side lower magnetic element 27Ba is denoted by $F_{mag.4A}$. Note that $R_m$ is also a radius from the center O of the tangent circle C to the center of the magnetic repulsive force $F_{mag.4A}$ between the counter-moment-generating mover-side lower magnetic element 17Ba and the counter-moment-generating stator-side lower magnetic element 27Ba.

$$x_g F_g < y_{mag.d} F_{mag.d} + R(F_{fric.3A} + F_{fric.4A}) + R_m(F_{mag.3A} + F_{mag.4A}) \quad (3)$$

Similarly to the first embodiment, in order to greatly alleviate the limit on the weight or the centroid position of the entire conveyance carrier 10B, it is only required to increase the magnetic attraction force $F_{mag.3A}$ and the magnetic repulsive force $F_{mag.4A}$ of the counter moment generating elements, or to increase the radius $R_m$ from the center O of the tangent circle C of the engagement surfaces between the upper and lower flat rollers 12Ba and 13Ba and the upper and lower flat rails 22B and 23B to the centers of the magnetic attraction force $F_{mag.3A}$ and the magnetic repulsive force $F_{mag.4A}$ of the counter moment generating magnetic elements.

In one example, the sum of the magnetic attraction forces between the counter-moment-generating mover-side upper magnetic elements 15Ba and 15Bb and the counter-moment-generating stator-side upper magnetic elements 25Ba and 25Bb and the magnetic repulsive forces between the counter-moment-generating mover-side lower magnetic elements 17Ba and 17Bb and the counter-moment-generating stator-side lower magnetic elements 27Ba and 27Bb, and the distance between the center O of the tangent circle C and each of the center of the magnetic attraction force and the center of the magnetic repulsive force are determined on the basis of the magnetic attraction force between the driving mover-side magnetic element 14B and the driving stator-side magnetic element 24B, a distance between the center of the magnetic attraction force and the center O of the tangent circle C, the sum of the frictional force in the contact surface between the upper flat roller 12Ba and the upper flat rail 22B and the frictional force in the contact surface between the lower flat roller 13Ba and the lower flat rail 23B, and the radius R of the tangent circle C.

An overhead view of a vicinity of the divergence portion of the linear conveyance device 1B according to the third embodiment is similar to the overhead view of the vicinity of the divergence portion of FIG. 9 of the second embodiment and thus omitted. Similarly to the second embodiment, the counter-moment-generating stator-side upper magnetic elements 25Ba and 25Bb and the counter-moment-generating stator-side lower magnetic elements 27Ba and 27Bb may be disposed only at the divergence portion 32 where the conveyance carrier 10B is in the "cantilever state", and may be omitted, that is, may not be disposed on the pre-divergence track 31 and the post-divergence track 33 which are other portions of tracks.

Figure 13:
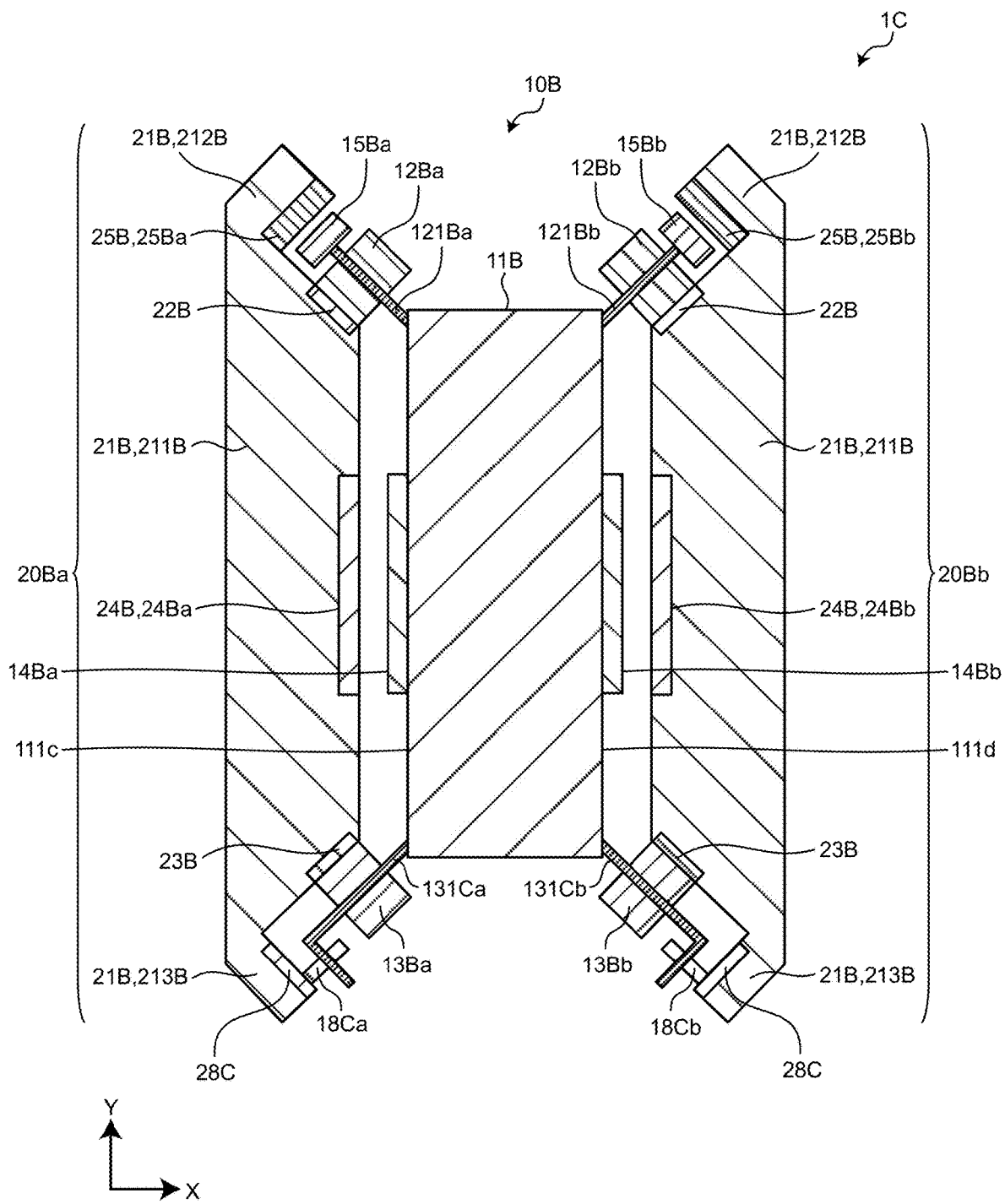
FIG. 13 is a cross-sectional view illustrating another example of the configuration of the linear conveyance device according to the third embodiment.

In the examples in FIGS. 10 to 12, the mover-side repulsive force generating elements and the stator-side repulsive force generating elements are realized by magnets or electromagnets, but may be realized by combinations of rollers and rails. FIG. 13 is a cross-sectional view illustrating another example of the configuration of the linear conveyance device according to the third embodiment. The same components as those in FIGS. 10 to 12 are denoted by the same reference numerals as those therein, and the descriptions thereof will be omitted. In a linear conveyance device 1C of FIG. 13, magnetic repulsive force generating elements that generate magnetic repulsive forces are different from those illustrated in FIGS. 10 to 12. That is, the conveyance carrier 10B includes counter-moment-generating mover-side additional rollers 18Ca and 18Cb instead of the counter-moment-generating mover-side lower magnetic elements 17Ba and 17Bb that generate the magnetic repulsive forces. Each of the stator-side platforms 20B includes a counter-moment-generating stator-side additional rail 28C instead of the counter-moment-generating stator-side lower magnetic element 27B. The counter-moment-generating mover-side additional rollers 18Ca and 18Cb correspond to mover-side repulsive force generating elements. The counter-moment-generating stator-side additional rail 28C corresponds to a stator-side repulsive force generating element.

At that time, a rotation axis 131Ca that supports the lower flat roller 13Ba has a structure bent in a hook shape, and the counter-moment-generating mover-side additional roller 18Ca is supported by a tip end portion bent in a hook shape. Similarly, a rotation axis 131Cb that supports the lower flat roller 13Bb has a structure bent in a hook shape, and the counter-moment-generating mover-side additional roller 18Cb is supported by a tip end portion bent in a hook shape. In each of cross sections of the counter-moment-generating mover-side additional rollers 18Ca and 18Cb passing through the rotation axes 131Ca and 131Cb, the shape of a rolling surface present in a radially peripheral edge portion is flat.

The counter-moment-generating stator-side additional rails 28C are provided on the lower side wall portions 213B of the platform structures 21B on which the counter-moment-generating stator-side lower magnetic elements 27B were provided, and have flat running surfaces. The counter-moment-generating stator-side additional rails 28C are provided at positions corresponding to the counter-moment-generating mover-side additional rollers 18Ca and 18Cb of the conveyance carrier 10B.

Also in that case, similarly to FIG. 9, the counter-moment-generating stator-side additional rails 28C may be installed only at the divergence portion 32, and may be omitted, that is, may not be disposed on the pre-divergence track 31 and the post-divergence track 33 which are other portions of tracks.

In a case where magnetic elements are used as counter moment generating elements that generate repulsive forces, magnetic repulsive forces greatly vary depending on a gap between the magnetic elements, and thus, it is necessary to manage the gap separately. However, as illustrated in FIG. 13, by changing the counter moment generating elements to the rollers and the rails, it is no longer necessary to manage gaps. On the other hand, in a case where the counter moment generating elements are realized by the rollers and the rails, since there is frictional resistance between the rollers and the rails, it is necessary to make compensation therefor with a driving force in the traveling direction of the conveyance carrier 10B.

Figure 14:
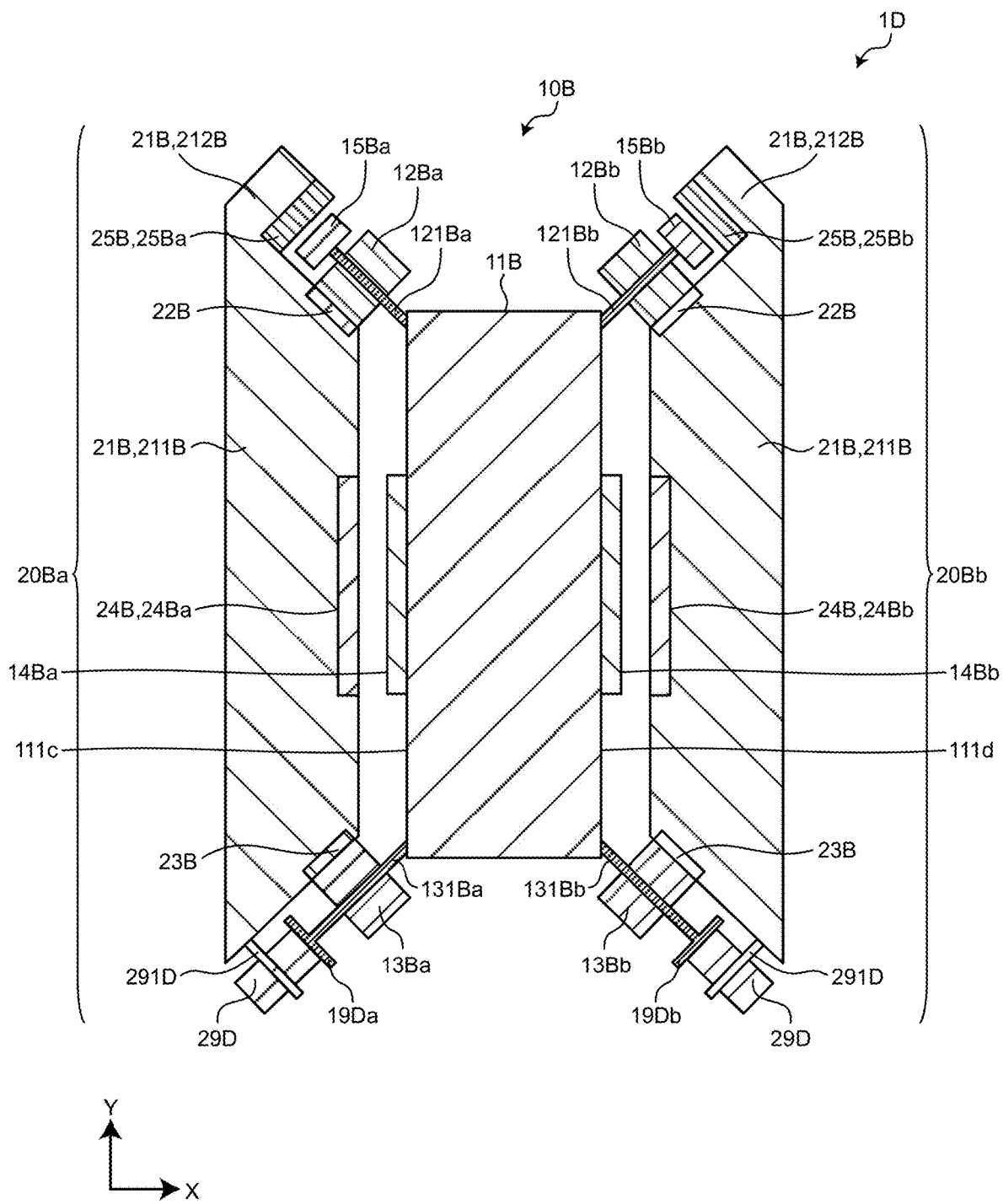
FIG. 14 is a cross-sectional view illustrating another example of the configuration of the linear conveyance device according to the third embodiment.

FIG. 14 is a cross-sectional view illustrating another example of the configuration of the linear conveyance device according to the third embodiment. The same components as those in FIGS. 10 to 13 are denoted by the same reference numerals as those therein, and the descriptions thereof will be omitted. In a linear conveyance device 1D of FIG. 14, configurations of magnetic repulsive force generating elements are different from those illustrated in FIG. 13. That is, the conveyance carrier 10B includes counter-moment-generating mover-side additional rails 19Da and 19Db instead of the counter-moment-generating mover-side additional rollers 18Ca and 18Cb. Each of the stator-side platforms 20B includes a counter-moment-generating stator-side additional roller 29D instead of the counter-moment-generating stator-side additional rail 28C. Note that the platform structure 21B has a structure not including the lower side wall portion 213B. In that case, it is necessary to dispose a plurality of counter-moment-generating stator-side additional rollers 29D on the stator-side platform 20B in a running direction. Each counter-moment-generating stator-side additional roller 29D is supported by a rotation axis 291D provided on the platform structure 21B.

The counter-moment-generating mover-side additional rails 19Da and 19Db correspond to mover-side repulsive force generating elements. The counter-moment-generating stator-side additional roller 29D corresponds to a stator-side repulsive force generating element.

In addition, similarly to FIG. 9, the counter-moment-generating stator-side additional roller 29D may be installed only at the divergence portion 32, and may be omitted, that is, may not be disposed on the pre-divergence track 31 and the post-divergence track 33 which are other portions of tracks.

As described above, by mounting the rails instead of the rollers on the conveyance carrier 10B, it is possible to reduce the weight of the conveyance carrier 10B as compared with the example in FIG. 13.

Also in the third embodiment, an effect similar to that in the first embodiment can be obtained.

In the first, second, and third embodiments described above, adsorption forces of the conveyance carriers 10, 10A, and 10B in the "cantilevered state" are each the sum of horizontal components of the magnetic attraction force $F_{mag.d}$ generated by the driving magnetic elements and the magnetic attraction force $F_{mag.add}$ of the counter moment generating elements. In conventional techniques, all the adsorption forces of the conveyance carriers 10, 10A, and 10B need to be generated only by the driving magnetic elements, but in the first, second, and third embodiments, the driving magnetic elements do not need to output the horizontal components of the magnetic attraction forces of the counter moment generating elements.

For example, in the case of the first embodiment, the magnitude of the magnetic attraction force generated between the driving mover-side magnetic element 14 and the driving stator-side magnetic element 24 can be a value obtained by subtracting a horizontal component of the magnetic attraction force between the counter-moment-generating mover-side magnetic element 15 and the counter-moment-generating stator-side magnetic element 25 from a value of an adsorption force required for adsorption to the stator-side platform 20 present on one side of the conveyance carrier 10 in the X direction.

In the first, second, and third embodiments, the mover-side counter moment generating elements and/or the stator-side counter moment generating elements may be constituted with electromagnets, and the linear conveyance devices 1, 1A, and 1B may further include a control device that controls energization of the electromagnets to change forces acting between the mover-side counter moment generating elements and the stator-side counter moment generating elements. The counter-moment-generating mover-side magnetic elements 15, 15Aa, and 15Ab, the counter-moment-generating mover-side upper magnetic elements 15Ba and 15Bb, and the counter-moment-generating mover-side lower magnetic elements 17Ba and 17Bb in the first, second, and third embodiments correspond to mover-side counter moment generating elements. The counter-moment-generating stator-side magnetic elements 25, 25Aa, and 25Ab, the counter-moment-generating stator-side upper magnetic elements 25Ba and 25Bb, and the counter-moment-generating stator-side lower magnetic elements 27Ba and 27Bb in the first, second, and third embodiments correspond to the stator-side counter moment generating elements. The forces acting between the mover-side counter moment generating elements and the stator-side counter moment generating elements include a magnetic attraction force or a magnetic repulsive force. Consequently, the magnetic attraction force or the magnetic repulsive force between the mover-side counter moment generating elements and the stator-side counter moment generating elements can be made variable by the energization control. As a result, it is possible to change the magnetic attraction force or the magnetic repulsive force to be generated depending on the weights and the centroid positions of the conveyance carriers 10, 10A, and 10B, or variations of gaps between the mover-side counter moment generating elements and the stator-side counter moment generating elements, or the like.

The configurations described in the above embodiments are merely examples and can be combined with other known technology, the embodiments can be combined with each other, and part of the configurations can be omitted or modified without departing from the gist thereof.

REFERENCE SIGNS LIST 1, 1A, 1B, 1C, 1D linear conveyance device; 10, 10A, 10B conveyance carrier; 11, 11A, 11B conveyance carrier main structure; 12, 12A upper V roller; 12Ba, 12Bb upper flat roller; 13, 13A, 13Ba, 13Bb lower flat roller; 14, 14A, 14Aa, 14Ab, 14B, 14Ba, 14Bb driving mover-side magnetic element; 15, 15A, 15Aa, 15Ab counter-moment-generating mover-side magnetic element; 15Ba, 15Bb counter-moment-generating mover-side upper magnetic element; 16A additional roller; 17Ba, 17Bb counter-moment-generating mover-side lower magnetic element; 18Ca, 18Cb counter-moment-generating mover-side additional roller; 19Da, 19Db counter-moment-generating mover-side additional rail; 20, 20A, 20Aa, 20Ab, 20B, 20Ba, 20Bb stator-side platform; 21, 21A, 21B platform structure; 22, 22A upper V-groove rail; 22B upper flat rail; 23, 23A, 23B lower flat rail; 24, 24A, 24Aa, 24Ab, 24B, 24Ba, 24Bb driving stator-side magnetic element; 25, 25A, 25Aa, 25Ab counter-moment-generating stator-side magnetic element; 25B, 25Ba, 25Bb counter-moment-generating stator-side upper magnetic element; 26A additional rail; 27B, 27Ba, 27Bb counter-moment-generating stator-side lower magnetic element; 28C counter-moment-generating stator-side additional rail; 29D counter-moment-generating stator-side additional roller; 31 pre-divergence track; 32 divergence portion; 33 post-divergence track; 111, 211A, 211B main body portion; 111a, 111b, 111c, 111d, 112a, 112b side surface; 112 overhanging portion; 121, 121A, 121Ba, 121Bb, 131, 131A, 131Ba, 131Bb, 131Ca, 131Cb, 161A, 291D rotation axis; 212A side wall portion; 212B upper side wall portion; 213B lower side wall portion.

The invention claimed is:

1. A linear conveyor that moves a conveyance carrier that conveys an object by a linear motor along a stator-side platform disposed in a width direction perpendicular to both a traveling direction of the conveyance carrier and an upper-lower direction, and includes a portion where the stator-side platform is disposed on one side in the width direction, wherein
the conveyance carrier includes:
a conveyance carrier main structure that supports the object;
a first roller provided on the conveyance carrier main structure;
a second roller provided on the conveyance carrier main structure at a height different from a height where the first roller is provided;
a mover-side magnetic material that is provided on a side surface on each of both sides of the conveyance carrier main structure in the width direction and drives the conveyance carrier main structure with respect to the stator-side platform; and
a mover-side counter moment generator that generates a counter moment against overturning of the conveyance carrier between the mover-side counter moment generator and the stator-side platform, and the stator-side platform includes:
a first rail that is provided on a platform structure provided along a movement path of the conveyance carrier and engages with the first roller;
a second rail that is provided on the platform structure and engages with the second roller;
a stator-side magnetic material provided on the platform structure and paired with the mover-side magnetic material to generate a magnetic attraction force in a horizontal direction; and
a stator-side counter moment generator that is disposed on the platform structure and generates the counter moment between the stator-side counter moment generator and the mover-side counter moment generator paired therewith.

2. The linear conveyor according to claim 1, wherein
the first roller is a V roller that rotates around an axis extending in the upper-lower direction,
the second roller is a flat roller that rotates around an axis extending in the upper-lower direction,
the mover-side counter moment generator is disposed at an upper portion of a side surface on each of both sides of the conveyance carrier main structure in the width direction,
the first rail is a V-groove rail that engages with the V roller,
the second rail is a flat rail that engages with the flat roller, and
the stator-side counter moment generator is disposed at an upper portion of the platform structure, and generates the counter moment by an attraction force in a horizontal direction generated between the stator-side counter moment generator and the mover-side counter moment generator paired therewith.

3. The linear conveyor according to claim 1, wherein
the conveyance carrier further includes an additional roller that is provided on each of both sides of the conveyance carrier main structure in the width direction and rotates around an axis extending in the width direction,
the stator-side platform further includes an additional rail that is provided on an upper surface of the platform structure and engages with the additional roller,
the first roller is a V roller that is provided on each of both sides of the conveyance carrier main structure in the width direction and rotates around an axis extending in the upper-lower direction,
the second roller is a flat roller that is provided on each of both sides of the conveyance carrier main structure in the width direction and rotates around an axis extending in the upper-lower direction,
the mover-side counter moment generator is disposed on an upper portion of a side surface on each of both sides of the conveyance carrier main structure in the width direction,
the first rail is a V-groove rail that engages with the V roller,
the second rail is a flat rail that engages with the flat roller, and
the stator-side counter moment generator is disposed at an upper portion of the platform structure, and generates the counter moment by an attraction force in a horizontal direction generated between the stator-side counter moment generator and the mover-side counter moment generator paired therewith.

4. The linear conveyor according to claim 3, wherein the stator-side counter moment generator is disposed on the stator-side platform at a divergence portion where the stator-side platform on each of both sides of the conveyance carrier in the width direction diverges, and is not disposed at a portion other than the divergence portion.

5. The linear conveyor according to claim 1, wherein
the first roller is an upper flat roller that is provided at an upper portion of each of both sides of the conveyance carrier main structure in the width direction and rotates around an upper rotation axis inclined at a predetermined inclination angle from the upper-lower direction,
the second roller is a lower flat roller that is provided at a lower portion of each of both sides of the conveyance carrier main structure in the width direction and rotates around a lower rotation axis inclined at the predetermined inclination angle from the upper-lower direction,
the first rail is an upper flat rail that engages with the upper flat roller,
the second rail is a lower flat rail that engages with the lower flat roller,
the mover-side counter moment generator includes:
a mover-side attraction force generator that is disposed at a tip end portion of the upper rotation axis and generates an attraction force between the mover-side attraction force generator and the stator-side platform; and
a mover-side repulsive force generator that is disposed at a tip end portion of the lower rotation axis and generates a repulsive force between the mover-side repulsive force generator and the stator-side platform, and
the stator-side counter moment generator includes:
a stator-side attraction force generator that is paired with the mover-side attraction force generator to generate an attraction force in a direction of the upper rotation axis; and
a stator-side repulsive force generator that is paired with the mover-side repulsive force generator to generate a repulsive force in a direction of the lower rotation axis.

6. The linear conveyor according to claim 5, wherein the mover-side repulsive force generator and the stator-side repulsive force generator are realized by a combination of a roller and a rail.

7. The linear conveyor according to claim 5, wherein the stator-side counter moment generator is disposed on the stator-side platform at a divergence portion where the stator-side platform on each of both sides of the conveyance carrier in the width direction diverges, and is not disposed at a portion other than the divergence portion.

8. The linear conveyor according to claim 1, wherein
when a rotation center is a center of the conveyance carrier when the conveyance carrier being in contact with the stator-side platform overturns,
an attraction force between the mover-side counter moment generator and the stator-side counter moment generator and a distance in the upper-lower direction between a center of the attraction force and the rotation center are determined on a basis of a magnetic attraction force between the mover-side magnetic material and the stator-side magnetic material and a distance in the upper-lower direction between a center of the magnetic attraction force and the rotation center.

9. The linear conveyor according to claim 1, wherein a magnitude of a magnetic attraction force generated between the mover-side magnetic material and the stator-side magnetic material is a value obtained by subtracting a horizontal component of a magnetic attraction force between the mover-side counter moment generator and the stator-side counter moment generator from a value of an adsorption force required for adsorption to the stator-side platform present on one side of the conveyance carrier in the width direction.

10. The linear conveyor according to claim 1, wherein the mover-side counter moment generator and the stator-side counter moment generator are realized by permanent magnets or electromagnets.

11. The linear conveyor according to claim 10, wherein
at least one of the mover-side counter moment generator and the stator-side counter moment generator is constituted with an electromagnet, and
the linear conveyor further comprises:
a controller to control energization of the electromagnet to change a force acting between the mover-side counter moment generator and the stator-side counter moment generator.

* * * * *